US011939815B2

(12) United States Patent
Janick et al.

(10) Patent No.: US 11,939,815 B2
(45) Date of Patent: Mar. 26, 2024

(54) SLIP FIT GUIDE

(71) Applicant: CornellCookson, LLC, Mountain Top, PA (US)

(72) Inventors: James Janick, Mountain Top, PA (US); Daniel Frack, Mountain Top, PA (US)

(73) Assignee: CornellCookson, LLC, Mountain Top, PA (US)

(*) Notice: Subject to any disclaimer, the term of this patent is extended or adjusted under 35 U.S.C. 154(b) by 0 days.

(21) Appl. No.: 16/649,874

(22) PCT Filed: Sep. 28, 2018

(86) PCT No.: PCT/US2018/053482
§ 371 (c)(1),
(2) Date: Mar. 23, 2020

(87) PCT Pub. No.: WO2019/067935
PCT Pub. Date: Apr. 4, 2019

(65) Prior Publication Data

US 2020/0300035 A1 Sep. 24, 2020

Related U.S. Application Data

(60) Provisional application No. 62/564,785, filed on Sep. 28, 2017.

(51) Int. Cl.
*E06B 9/58* (2006.01)

(52) U.S. Cl.
CPC .......... *E06B 9/58* (2013.01); *E06B 2009/587* (2013.01)

(58) Field of Classification Search
CPC ...... E06B 9/58; E06B 9/581; E06B 2009/587; E06B 9/56; E06B 9/11; E06B 9/13; E06B 2009/1577; E06B 2009/1533; E06B 2009/155; E06B 2009/1555; E06B 2009/1561
See application file for complete search history.

(56) References Cited

U.S. PATENT DOCUMENTS

| | | | | |
|---|---|---|---|---|
| 471,114 A * | 3/1892 | Haswell | .................... | E06B 9/58 160/277 |
| 1,091,849 A * | 3/1914 | King | .......................... | F16B 5/10 24/DIG. 54 |
| 1,247,938 A | 11/1917 | Curtenius | | |

(Continued)

FOREIGN PATENT DOCUMENTS

| | | |
|---|---|---|
| WO | 2016004966 A1 | 1/2016 |

OTHER PUBLICATIONS

International Search Report dated Dec. 21, 2018 for International Patent Application No. PCT/US2018/053482, 2 pages.

(Continued)

*Primary Examiner* — Abe Massad
*Assistant Examiner* — Matthew R. Shepherd

(57) ABSTRACT

In one embodiment, a guide system includes a first member configured to be fixed to a structure. A coupling element is fixed to the first member. A second member is moveable relative to the first member. The second member is configured to receive the coupling element to couple the first member to the second member. There is a channel between the first member and the second member when the first member is coupled to the second member. The channel is configured to receive a portion of a closure.

14 Claims, 26 Drawing Sheets

(56) References Cited

U.S. PATENT DOCUMENTS 1,303,770 A * 5/1919 Carr .......................... F16B 5/10
24/DIG. 58
1,705,085 A 3/1929 Duncanson
2,041,105 A * 5/1936 Barnhart ................... E06B 9/50
160/31
2,120,530 A * 6/1938 Shippee .................... F16B 5/10
411/352
2,285,661 A * 6/1942 Hryzack ................... F16B 5/10
411/553
2,445,009 A * 7/1948 Strauss ................ H01B 17/145
256/48
2,593,064 A * 4/1952 Silberman ............. B25B 31/005
411/352
2,728,259 A * 12/1955 Poupitch ................... F16B 5/06
24/453
2,826,388 A * 3/1958 Janos .................... F25D 23/067
403/252
3,304,681 A * 2/1967 Wunderlich ........... B60J 10/265
49/377
3,468,509 A 9/1969 Foltz
3,540,088 A * 11/1970 Simpson ............ G11B 19/2009
4,007,516 A * 2/1977 Coules .................... F16B 21/04
411/548
4,293,263 A * 10/1981 Zankl ...................... F16B 21/09
24/701
4,382,518 A * 5/1983 Bondoux ............... A47B 57/50
211/192
4,778,067 A * 10/1988 Bellerose ............... A47B 57/36
211/187
5,408,724 A 4/1995 Mullet et al.
5,568,672 A 10/1996 Mullet et al.
5,718,533 A 2/1998 Mullet et al.
5,778,804 A 7/1998 Read
5,992,497 A * 11/1999 Jaehnen .................. E05D 15/24
16/225
6,065,525 A * 5/2000 Wells ........................ E06B 9/58
160/273.1
6,068,040 A * 5/2000 Magro .................... E06B 9/581
160/133
6,682,056 B1 1/2004 West
6,745,814 B2 6/2004 Hoofard et al.
6,834,464 B2 * 12/2004 Shoemaker ......... E05B 65/0021
160/201
7,669,443 B2 3/2010 Varner
8,037,576 B2 10/2011 Meichtry
9,187,953 B2 * 11/2015 Drifka ....................... E06B 9/13
2004/0200583 A1 * 10/2004 Nien ......................... E06B 9/76
160/177 R
2004/0211033 A1 10/2004 Mullet et al.
2005/0016695 A1 * 1/2005 Thompson ................ E06B 9/13
160/268.1
2014/0311689 A1 * 10/2014 Gomaa ................... E06B 9/581
160/270
2017/0284154 A1 * 10/2017 Reiner .................. E06B 3/4636

OTHER PUBLICATIONS

Written Opinion dated Dec. 21, 2018 for International Patent Application No. PCT/US2018/053482, 9 pages.

* cited by examiner

SLIP FIT GUIDE

CROSS-REFERENCE TO RELATED APPLICATIONS

This application is a 371 of International Application No. PCT/US2018/053482 filed on Sep. 28, 2018, which claims the benefit of U.S. Provisional Patent Application No. 62/564,785 filed Sep. 28, 2017 entitled "Slip Fit Guide", each of which is incorporated by reference herein in its entirety.

BACKGROUND OF THE INVENTION

The present invention generally relates to a guide system and, more particularly, to a slip fit guide for a retractable closure such as a door or curtain.

SUMMARY OF THE INVENTION

In one embodiment, a guide system may include a first member, a coupling element, and a second member. The first member may be configured to be fixed to a structure, the coupling element may be fixed to the first member, and the second member may be moveable relative to the first member. The second member may be configured to receive the coupling element to couple the first member to the second member. The guide system may include a channel between the first member and the second member when the first member is coupled to the second member. The channel may be configured to receive a portion of a closure.

The closure may be configured to move between an open position and a closed position with the portion of the closure in the channel. The second member may include an opening configured to receive the coupling element. The opening may include a first portion having a first portion width and a second portion having a second portion width. The first portion width may be greater than the second portion width. The coupling element may include a head having a head width and a body having a body width, the head width may be greater than the body width. The head width may be less than the first width and greater than the second width. The body width may be less than the first width and the second width. The first member may include a first surface and the head may be spaced from the first surface. The second member may be configured to be positioned adjacent the first surface by moving the second member relative to the first member in a first direction such that the head passes through the first portion of the opening. The second member may be configured to move relative to the first member in a second direction such that body may be moved from the first portion to the second portion of the opening. The second member may be prevented from moving in the first direction when the body may be within the second portion. The head may comprise a wedge configured to secure the second member between the head and a first surface of the first member. The wedge may include a deflectable arm configured to deflect when the second member contacts the deflectable arm.

In a further embodiment, the guide system may include an anchor coupled to the first member, the anchor may be configured to secure the first member to a structure. The second member may include a second opening configured to receive a portion of the anchor when the second member is adjacent the first member.

In a further embodiment, the guide system may include a fastener configured to prevent movement of the second member relative to the first member in the second direction. The first member may include a first segment and a second segment, the second segment may be transverse to the first segment. The second member may include a first portion and a second portion, the second portion may be transverse to the first portion. The coupling element may be fixed to the first segment and the first portion may include the opening. The channel may be at least partially defined by the second segment and the second portion. The second member may include a third portion coupled to the second portion, the third portion may be transverse to the second portion. The second member may include a fourth portion coupled to the third portion and the first portion, the fourth portion may be transverse to each of the third portion and the first portion. The fourth portion may be parallel to the second portion. The third portion may be parallel to the first portion. At least one of the coupling element and the anchor may not be visible from outside the channel when the second member may be coupled to the first member.

In one embodiment, a guide system may be configured to be positioned adjacent an opening and the guide system may include a closure means for selectively occluding the opening, the closure means moveable from an open position toward a closed position. The guide system may include a first guide means configured to be fixed to a sidewall of the opening. The guide system may include a coupling means fixed to the first guide means. The guide system may include a second guide means configured to be moveable relative to the first member. The second guide means may be configured to receive the coupling element to couple the first guide means to the second guide means. A channel may be formed between the first guide means and the second guide means when the first guide means is coupled to the second guide means. The channel may be configured to receive a portion of the closure means.

BRIEF DESCRIPTION OF THE SEVERAL VIEWS OF THE DRAWINGS

The following detailed description of embodiments of the slip fit guide, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Figure 1:
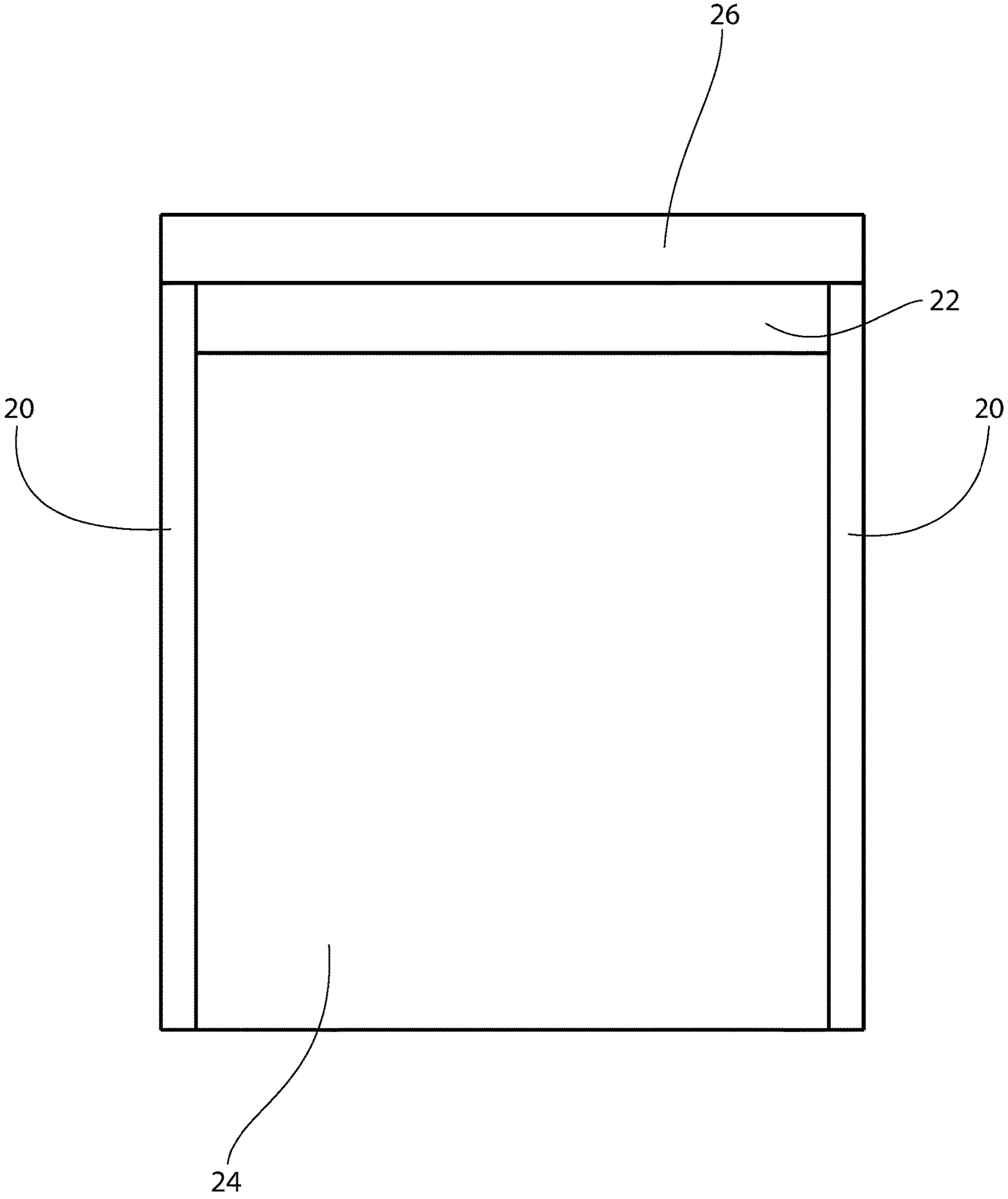
FIG. 1 is a front view of a closure system including a guide in accordance with an exemplary embodiment of the present invention.

In one embodiment, there is a guide system adapted to receive a sliding closure such as a flexible closure. In one embodiment the guide system includes an assembly adapted to fit together through a secure sliding motion. When fit together, embodiments of the assembly will accommodate wind locks and door locks that are smooth functioning, tamper resistant, aesthetically pleasing and not visible from the exterior of the closure. In addition, the installation of the assembly and closure may be facilitated by a modular prefabricated construction. Some embodiments of the guide system include a first member configured to be fixed to a structure, a coupling element fixed to the first member; and a second member moveable relative to the first member, the second member configured to receive the coupling element to couple the first member to the second member; wherein there is a channel between the first member and the second member when the first member is coupled to the second member, the channel configured to receive a portion of a closure. The guide system may be configured to attach to any passageway opening but may be especially useful in accommodating rolling closures such those found in storefronts. Among the benefits of embodiments of the present invention is to facility installation and/or repair of the guide system. It is also desirable to provide a closure system that is aesthetically pleasing that, for example, limits the sight lines to attachment fixtures while providing for a compact, secure means for guiding retractable closures. It is also desirable to provide a closure system that can accommodate a locking system internally to a guide structure that is both aesthetically pleasing and tamper resistant.

The invention will be more clearly understood from the following examples. Referring to the drawings in detail, wherein like reference numerals indicate like elements throughout, there is thus shown in FIGS. 1-7 exemplary embodiments of the present invention.

In one embodiment, a guide 20 is adapted to receive at least a portion of a closure 22 (e.g., a door, a screen, or a window). In one embodiment, the guide 20 is positioned adjacent an opening 24 and the closure 22 may be moveable between an open position and a closed position with the portion of the closure 22 within the guide 20. In one embodiment, the closure 22 is a flexible closure and can be stored in a hood 26 or headspace enclosure (e.g., when rolled into an open position) when the closure 22 is in the open position. In one embodiment, the closure 22 is a curtain or grille. In one embodiment, the closure 22 is adapted to obscure an opening (e.g., a doorway, a window, or an opening in a wall) when the closure 22 is in the closed position.

In one embodiment, guides 20 are positioned on opposing sides of the opening 24. In one embodiment, a width of the opening 24 is the width between the guides 20 and the width is between about 10 feet and about 30 feet. In one embodiment, the width is about 6 feet, about 8 feet, about 10 feet, about 12 feet, about 14 feet, about 16 feet, about 18 feet, about 20 feet, about 22 feet, about 24 feet, about 26 feet, about 28 feet, about 30 feet or about 32 feet. In one embodiment, the width of the opening 24 is between about 3 feet and about 26 feet. In one embodiment, a height of the opening 24 is between about 3 feet and about 20 feet.

Figure 2:
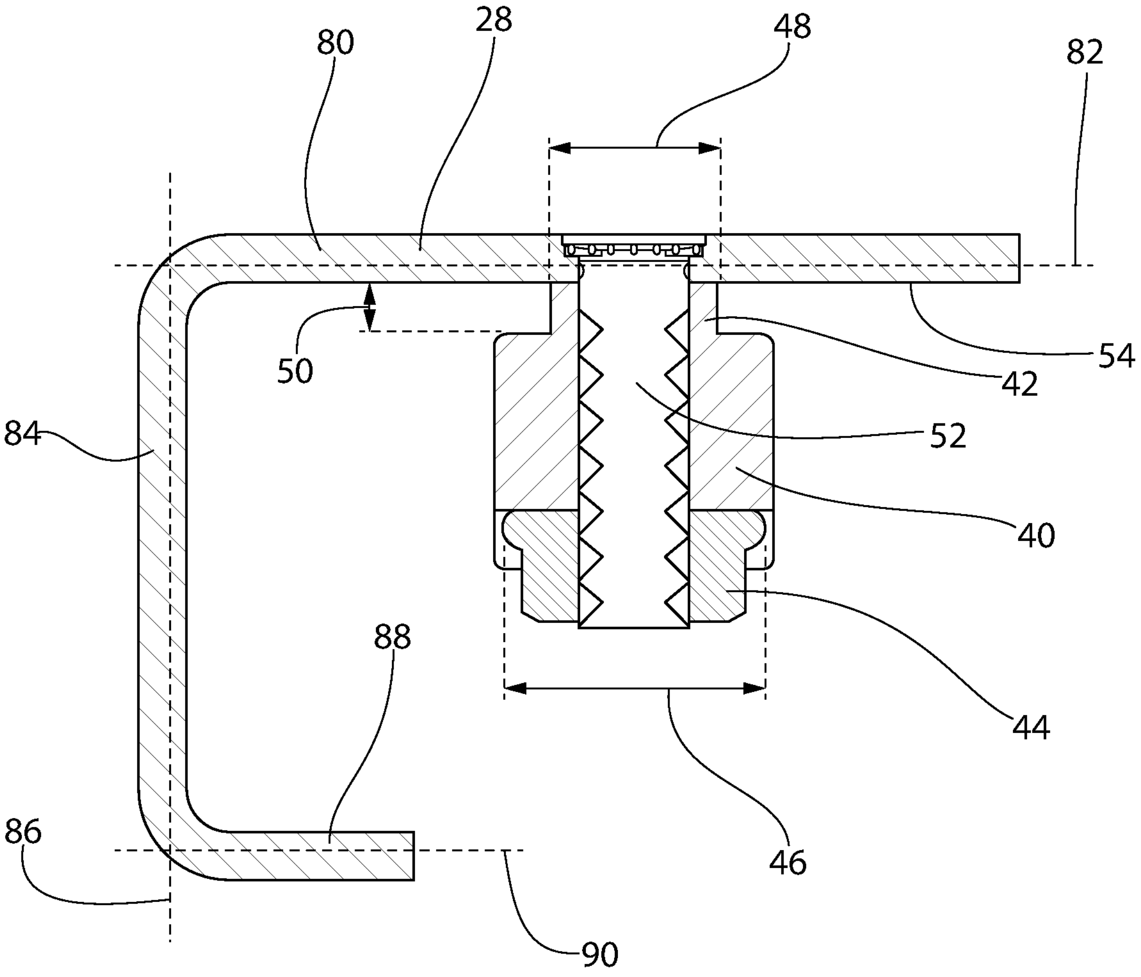
FIG. 2 is a top, sectional view of a first member of the guide of FIG. 1.
Figure 3:
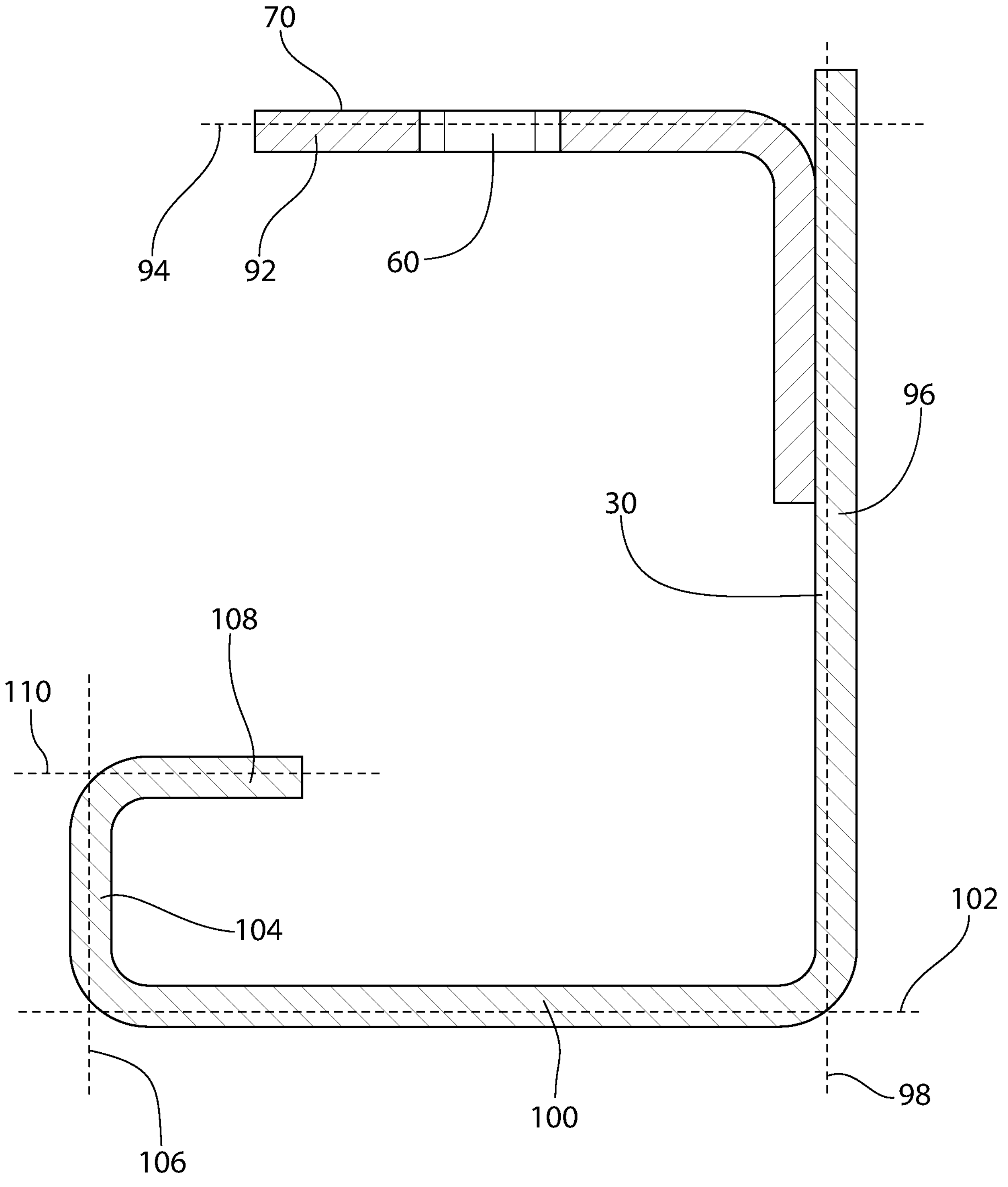
FIG. 3 is a top, section view of a second member of the guide of FIG. 1.
Figure 4:
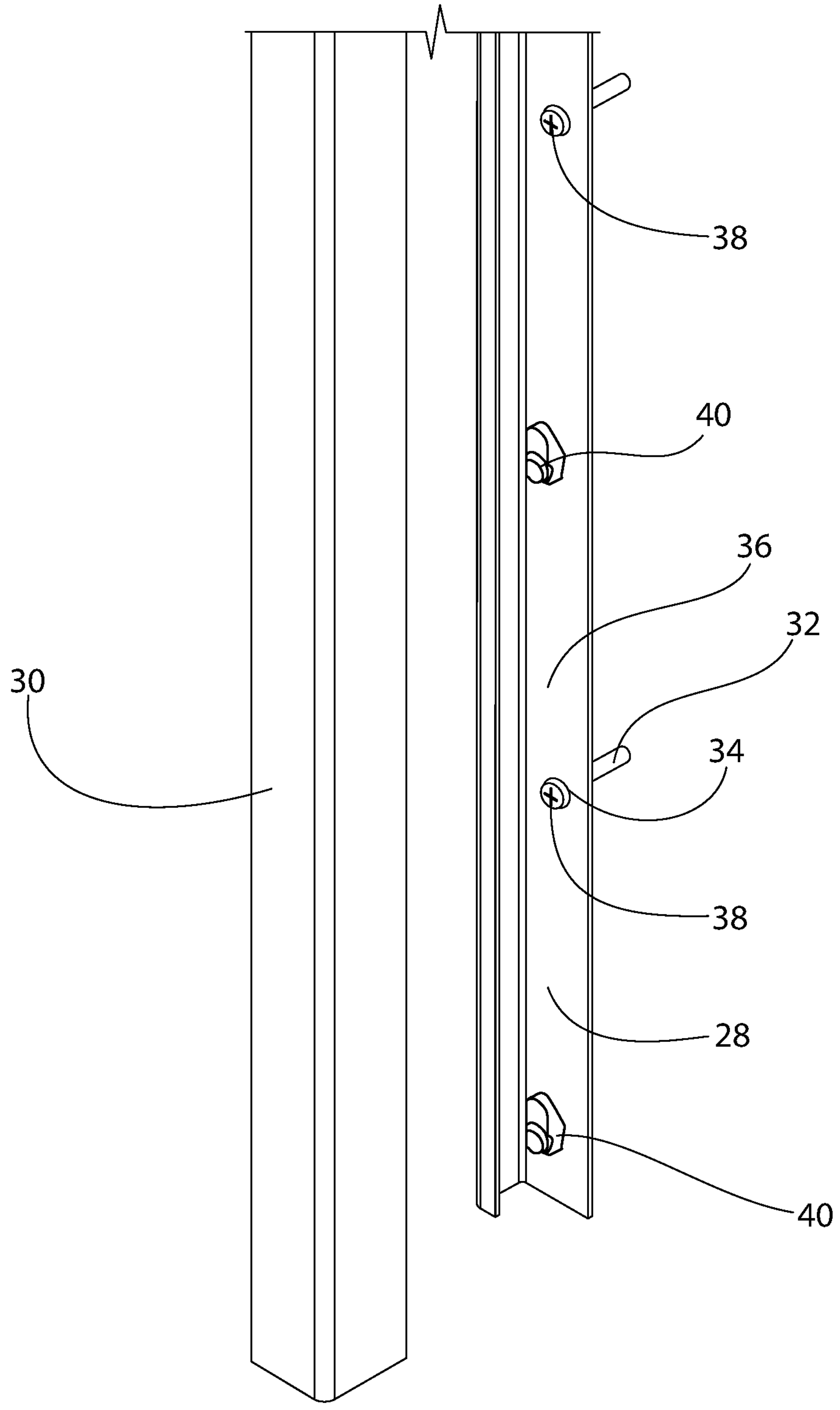
FIG. 4 is an exploded view of the guide of FIG. 1.

In one embodiment, the guide 20 includes a first member 28 (FIG. 2) and a second member 30 (FIG. 3). In one embodiment, the first member 28 is coupleable to a structure (e.g., a wall, an edge of the opening 24, a support beam or tube, or a doorjamb). In one embodiment, the first member 28 includes an anchor 32 (FIGS. 4-5) adapted to secure the first member 28 to the structure. In some embodiments first member 28 is adapted to receive and/or engage with anchor 32 that is adapted to secure the first member 28 to the structure. For example, the anchor 32 may include a screw, a bolt, or other threaded anchor that threadedly engages the structure. In one example, the anchor 32 may include a magnet, adhesive, an expandable anchor, non-threaded anchor (such as a rivet), or a welded joint. In one embodiment, the first member 28 includes an anchor opening 34 adapted to receive the anchor 32 (FIG. 4). In some embodiments, the geometric features (e.g., width, size, shape) of the anchor opening 34 are selected based on the type of anchor 32 selected. For example, a threaded anchor opening 34 may be adopted when a threaded anchor is selected. In one embodiment, the anchor opening 34 includes a chamfered edge such that a machine head fastener may sit flush with a first surface 36 of the first member 28 when the anchor 32 is seated within the anchor opening 34. In one embodiment, a head 38 of the anchor 32 sits proud of the first surface 36 when the anchor is within the anchor opening 34.

Figure 15:
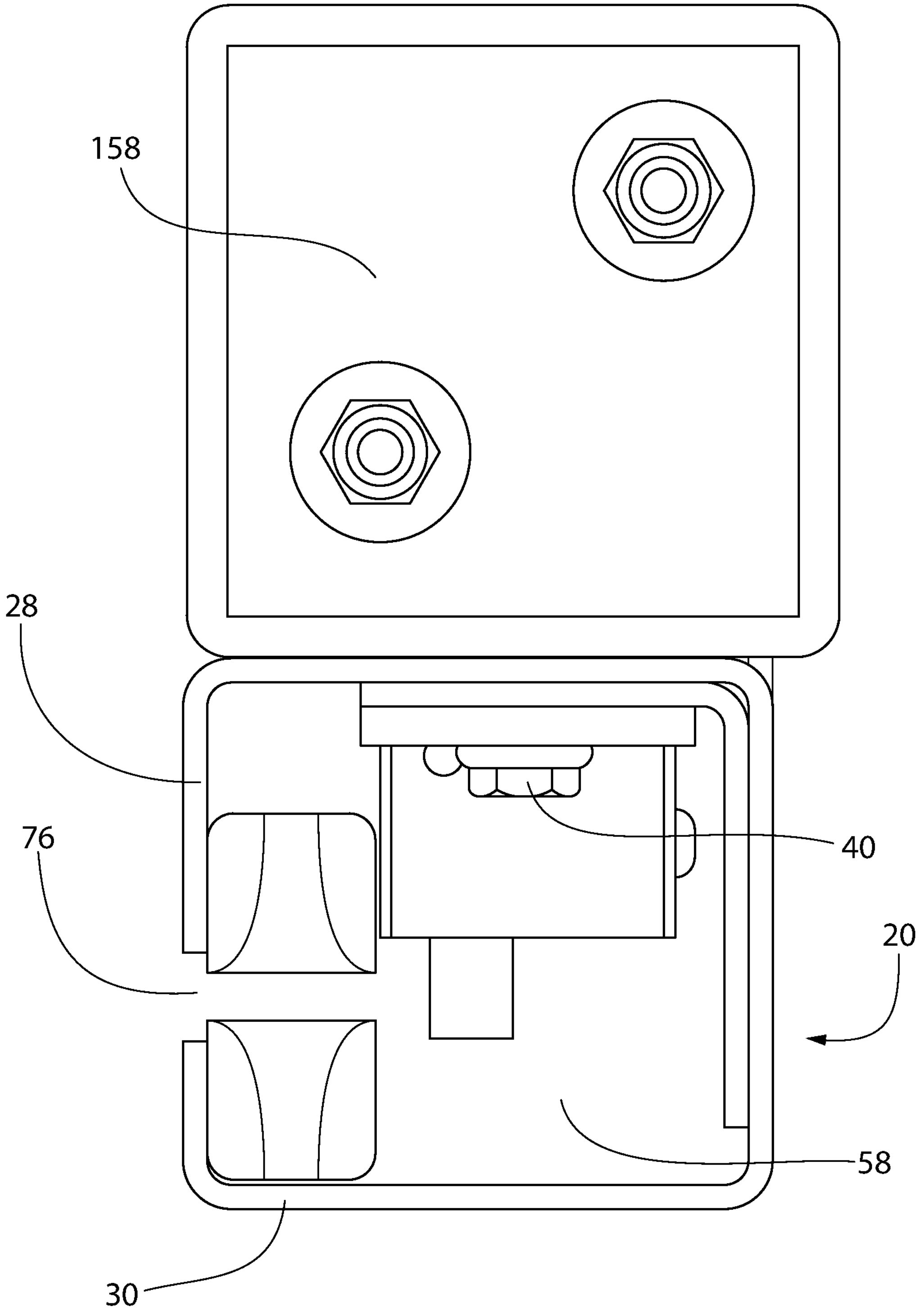
FIG. 15 is a top, plan view of the guide of FIG. 1 coupled to a tube.
Figure 16:
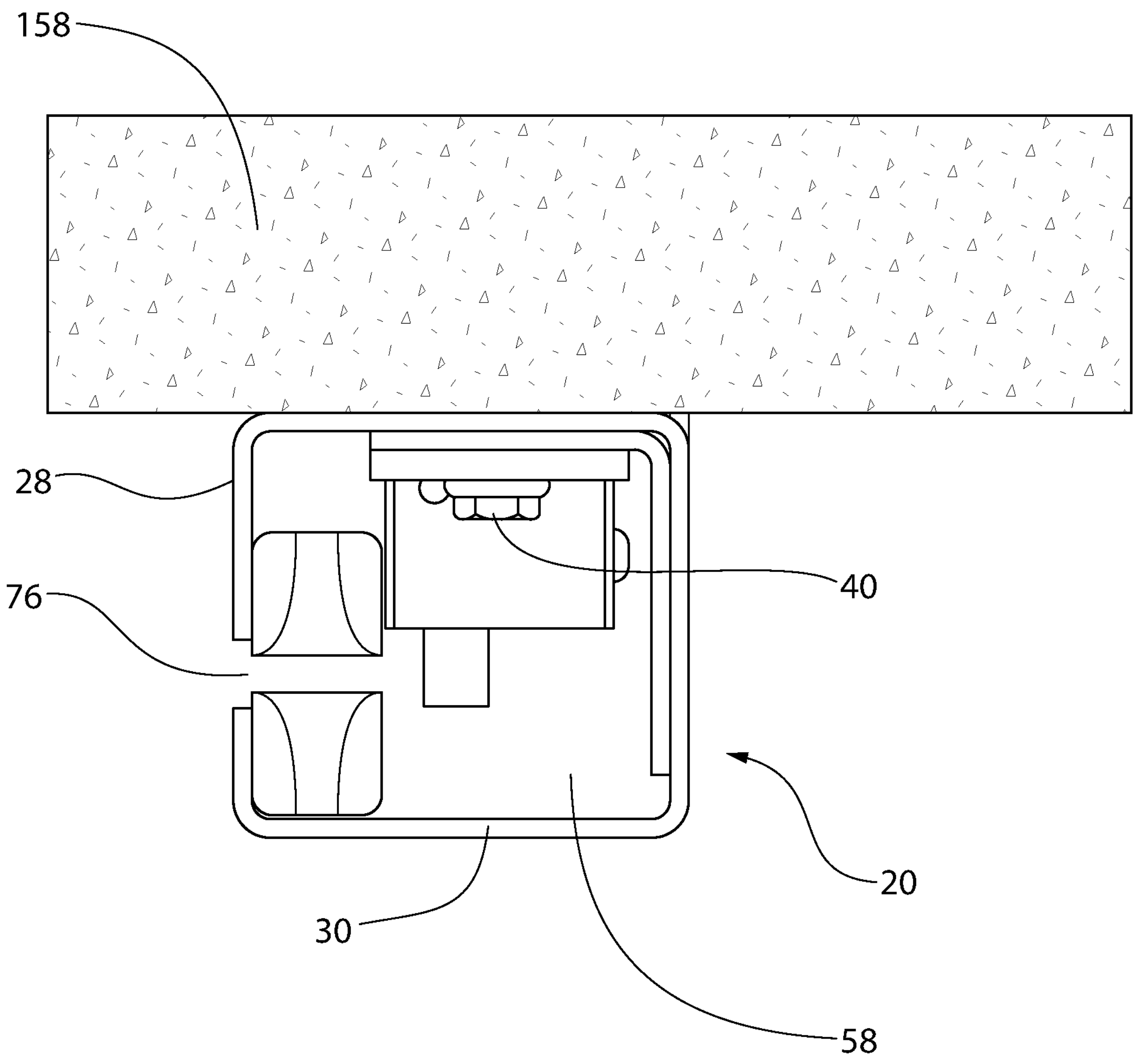
FIG. 16 is a top, plan view of the guide of FIG. 1 coupled to a wall.
Figure 17:
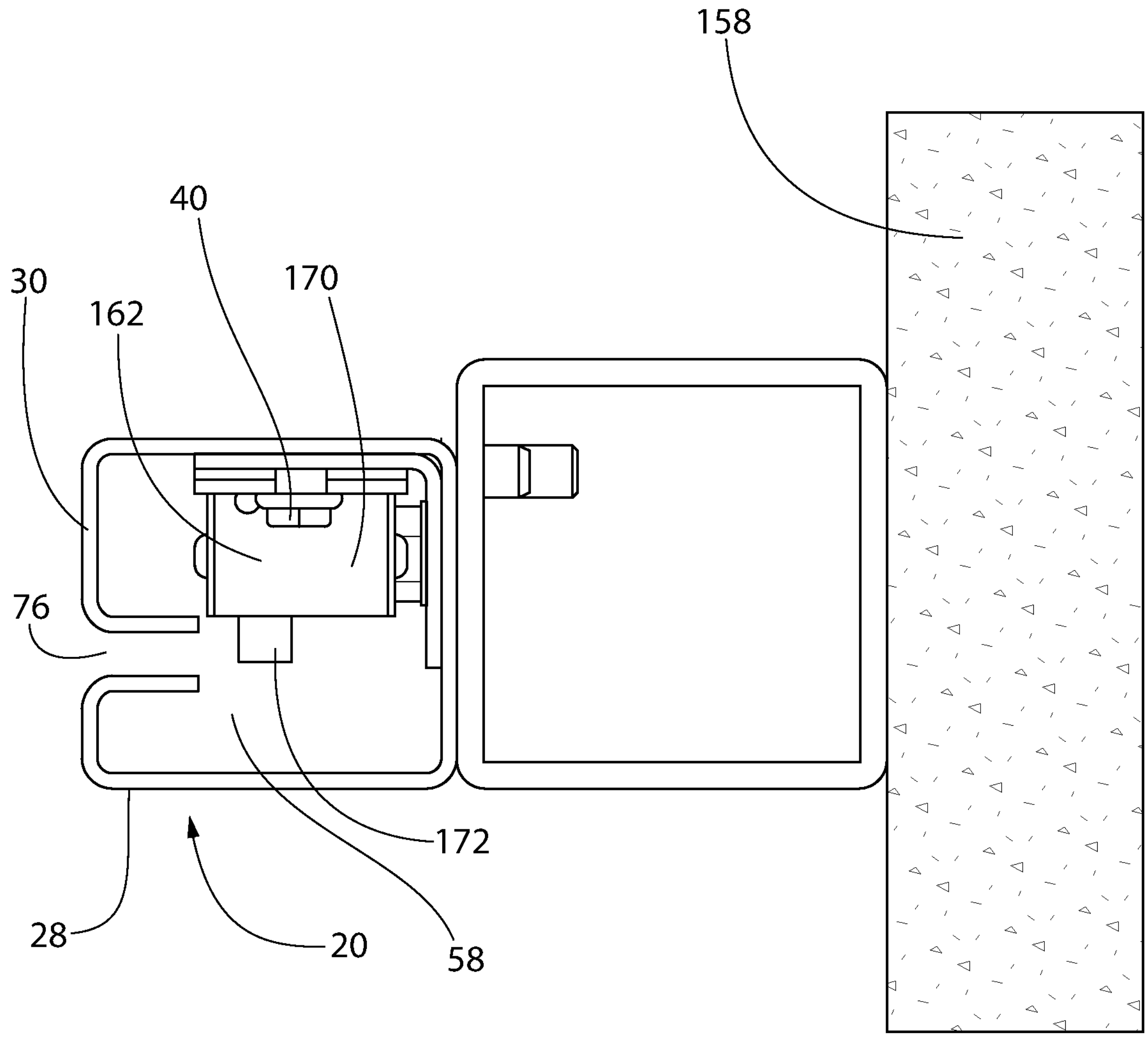
FIG. 17 is a top, plan view of the guide of FIG. 1 coupled to a jamb.

In one embodiment, the second member 30 is adapted to be coupled to the first member 28. First member 28 and second member 30 may be configured to form guide 20 that is adapted to be coupled to the structure (FIGS. 15-17). In one embodiment, the second member 30 is detachably couplable to the first member 28 and may be coupled to first member 28 when in use. In one embodiment, the guide 20 includes a coupling means (e.g., a pawl and groove engagement, a hook and loop fastener, magnets, a threaded fastener, a weld, a rivet, adhesive, or a nail) for coupling the first member 28 to the second member 30. In one embodiment, the coupling means temporarily couples the first member 28 to the second member 30. In one embodiment, the coupling means is configured to facilitate the coupling and decoupling of the first member 28 and second member 30. One benefit of being able to couple and decouple the first member 28 and second member 30 is to permit repairs and replacement of elements of guide 20. Another benefit may include facilitating installation and fit out of the guide 20. In one embodiment, the coupling means fixes the first member 28 to the second member 30.

In one embodiment, the coupling means is a coupling element 40 (FIG. 2). In one embodiment, the coupling element 40 is fixed to one of the first member 28 and the second member 30. Coupling element 40 is preferably adapted to engage the other of the first member 28 and the second member 30 to at least temporarily couple the first member 28 to the second member 30. In one embodiment, the coupling element 40 includes a body 42 and a head 44. The head 44 may be defined by a head width 46. The body may be defined by a body width 48. In one embodiment, the head width 46 is greater than the body width 48. In one embodiment, the head width 46 is about 50% to about 100% larger than the body width 48. In some embodiments, guide 20 includes a plurality of coupling members. The plurality of coupling means may be spaced apart in selected locations along guide 20. In one embodiment, the guide 20 does not include a first member 28, instead, the coupling element 40 is coupled to a wall or structure adjacent the opening.

Figure 7:
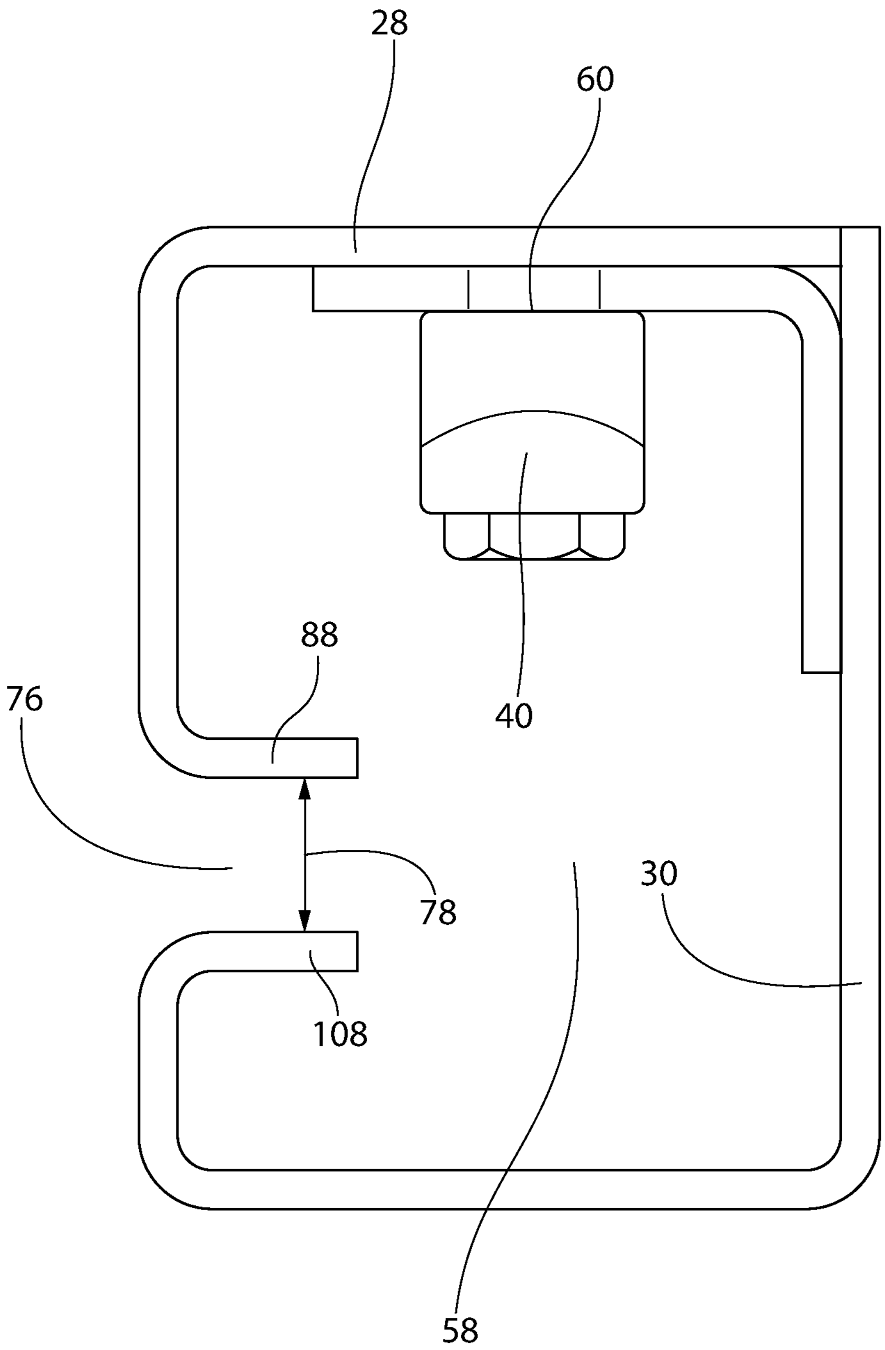
FIG. 7 is a top, plan view of the guide of FIG. 1.
Figure 8:
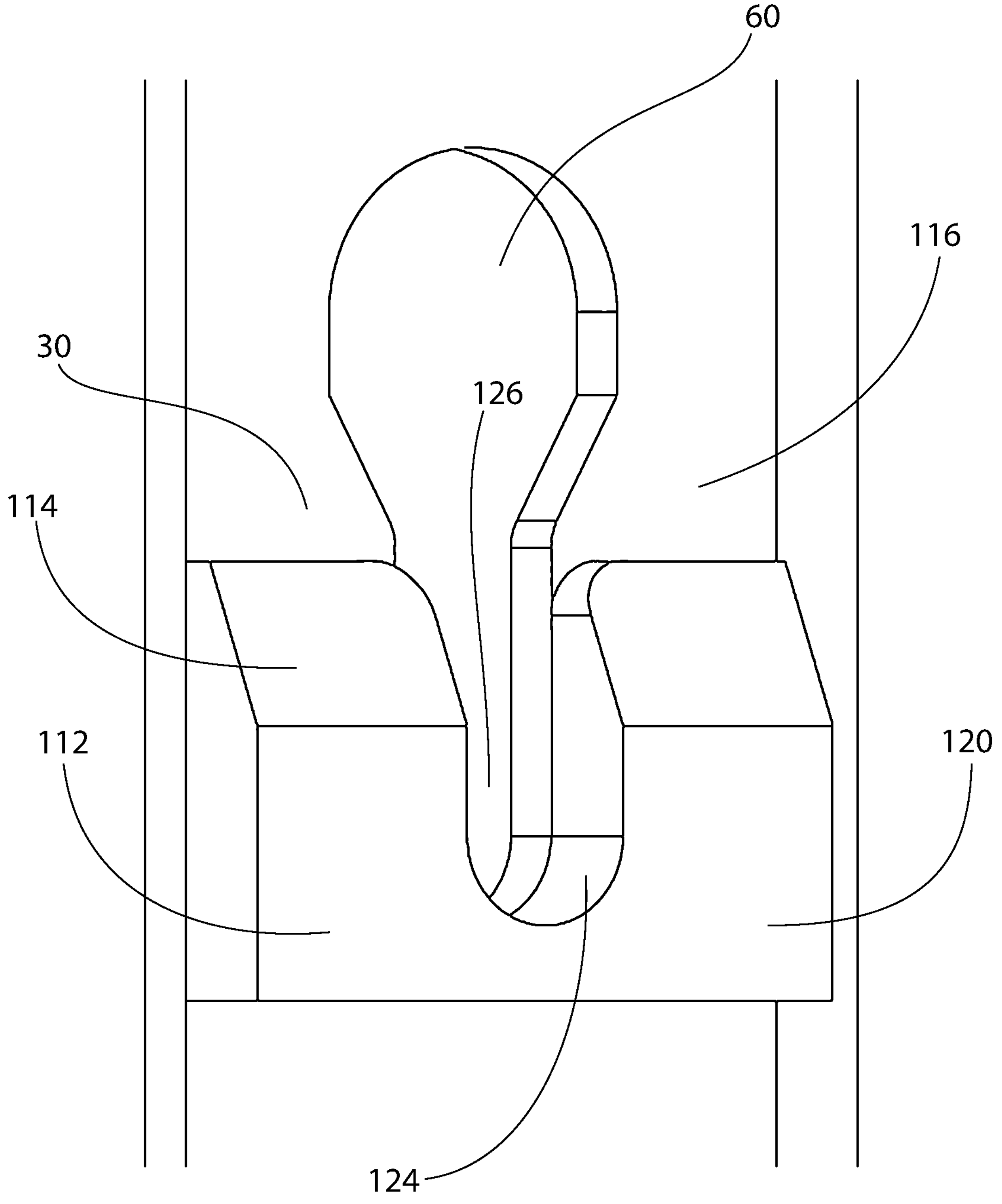
FIG. 8 is a close-up view of a second member in accordance with another exemplary embodiment of the present invention.
Figure 9:
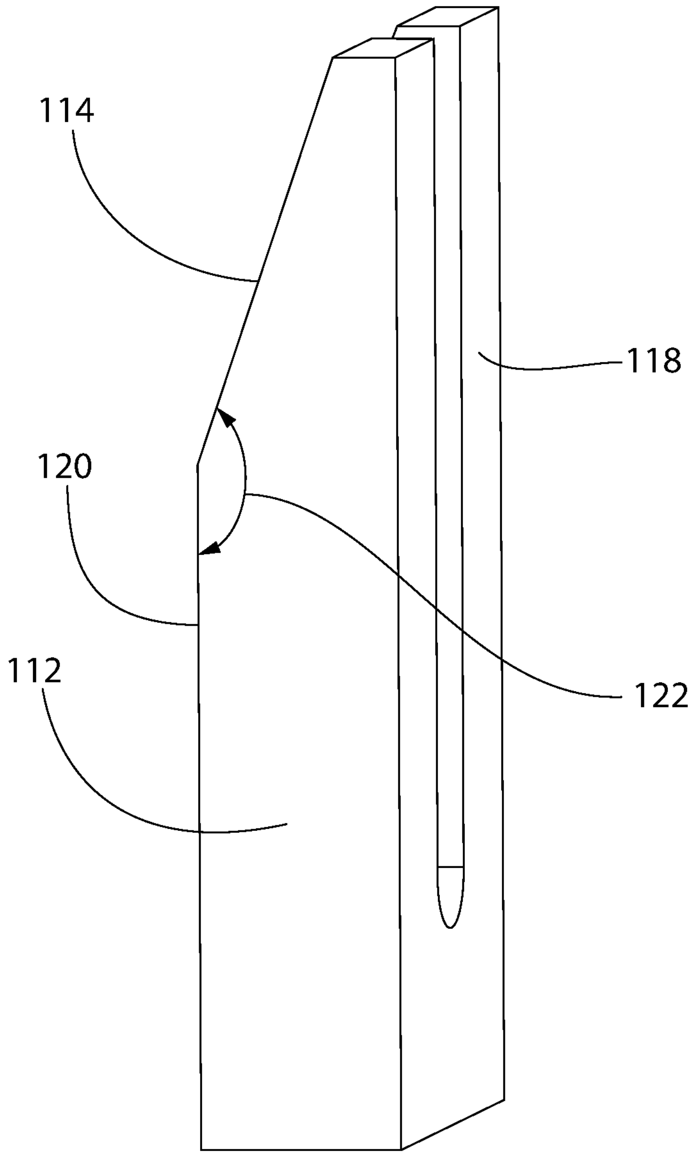
FIG. 9 is a top, rear, right-side perspective view of the ramp of FIG. 8.
Figure 10:
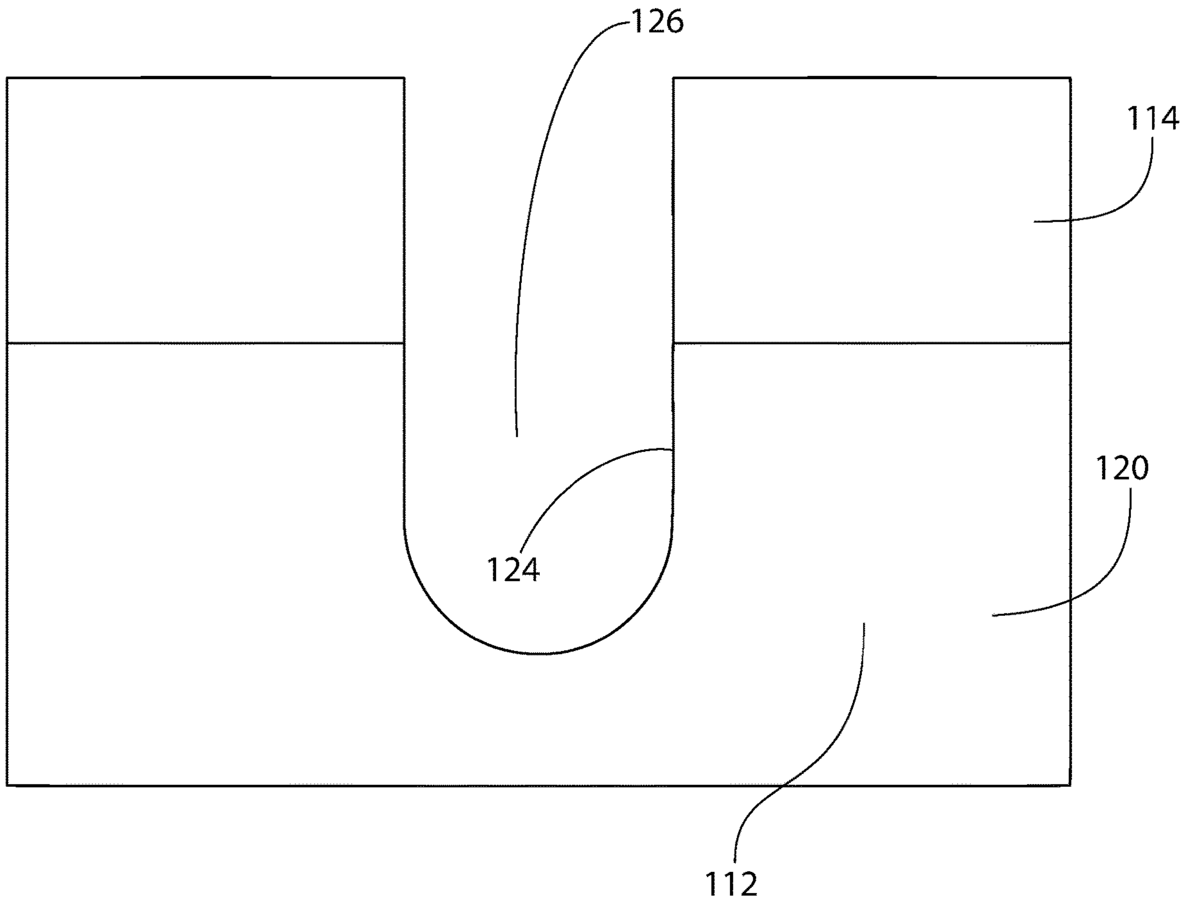
FIG. 10 is a front view of the ramp of FIG. 8.
Figure 11:
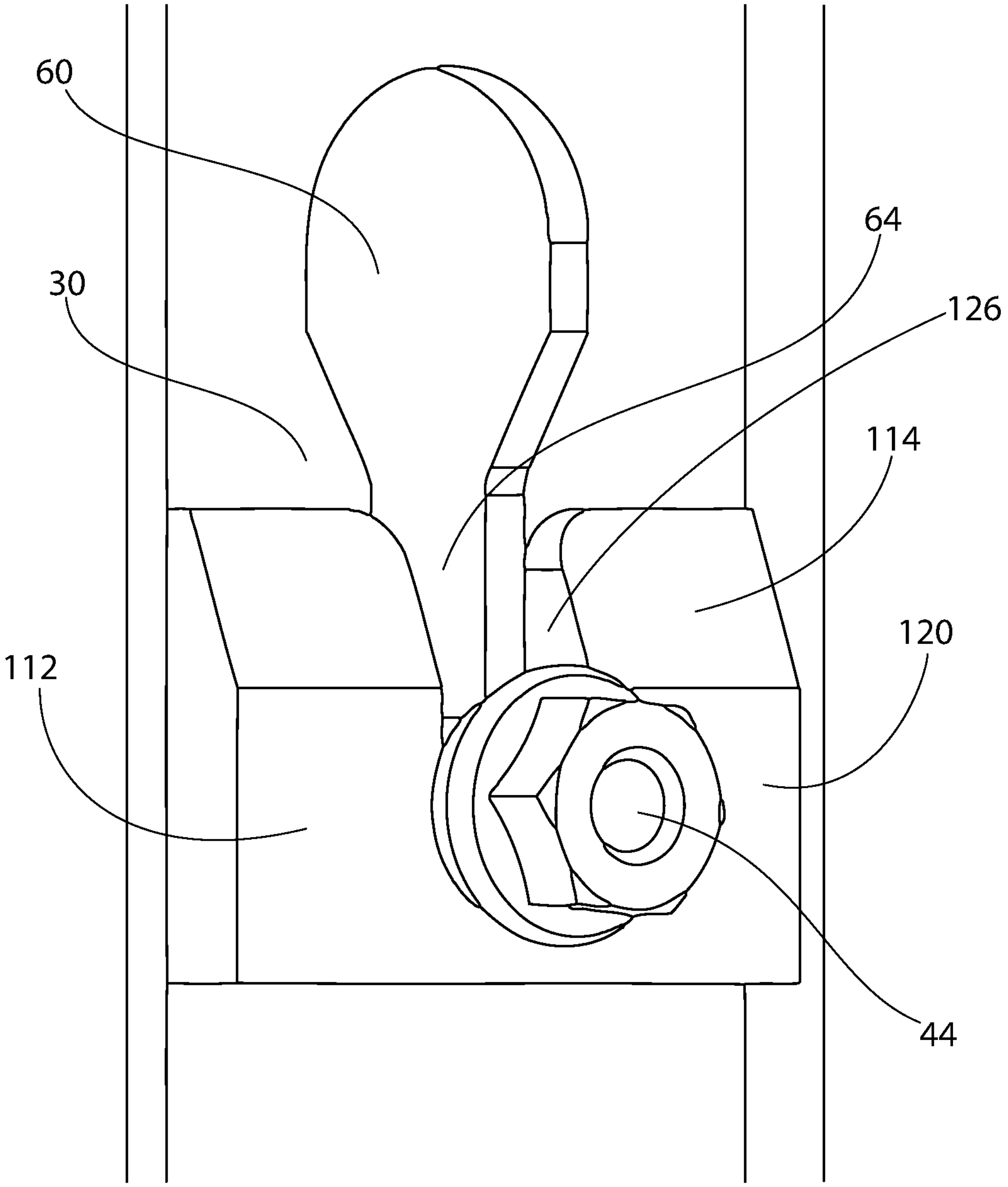
FIG. 11 is a close-up view of the second member of FIG. 8 with a coupling element.

In one embodiment, the body 42 is defined by a length 50. In one embodiment, the length 50 is selected such that the body 42 extends through an opening 60 in the second member 30 and a portion of the second member 30 is positioned between the head 44 and the first member 28 when the second member 30 is coupled to the first member 28 (FIG. 7). In one embodiment, the coupling element 40 includes a fastener 52 (e.g., a threaded fastener, a rivet, or a dowel) and the head 44 is a nut or other type of connecting element adapted to be fixed to the fastener 52. In one embodiment, the head 44 is a nut that is partially threaded onto the fastener 52 and the head 44 is tightened after the second member 30 is coupled to the first member 28. In one embodiment, the fastener 52 extends through the first member 28. In another embodiment, the fastener 52 is fixed to a first surface 54 of the first member 28 and the fastener 52 stands proud of the first surface 54. In one embodiment, the first member 28 includes a plurality of anchors 32 and a plurality of coupling elements 40 alternatingly positioned along the length of the first member 28 (FIGS. 4-5).

Figure 5:
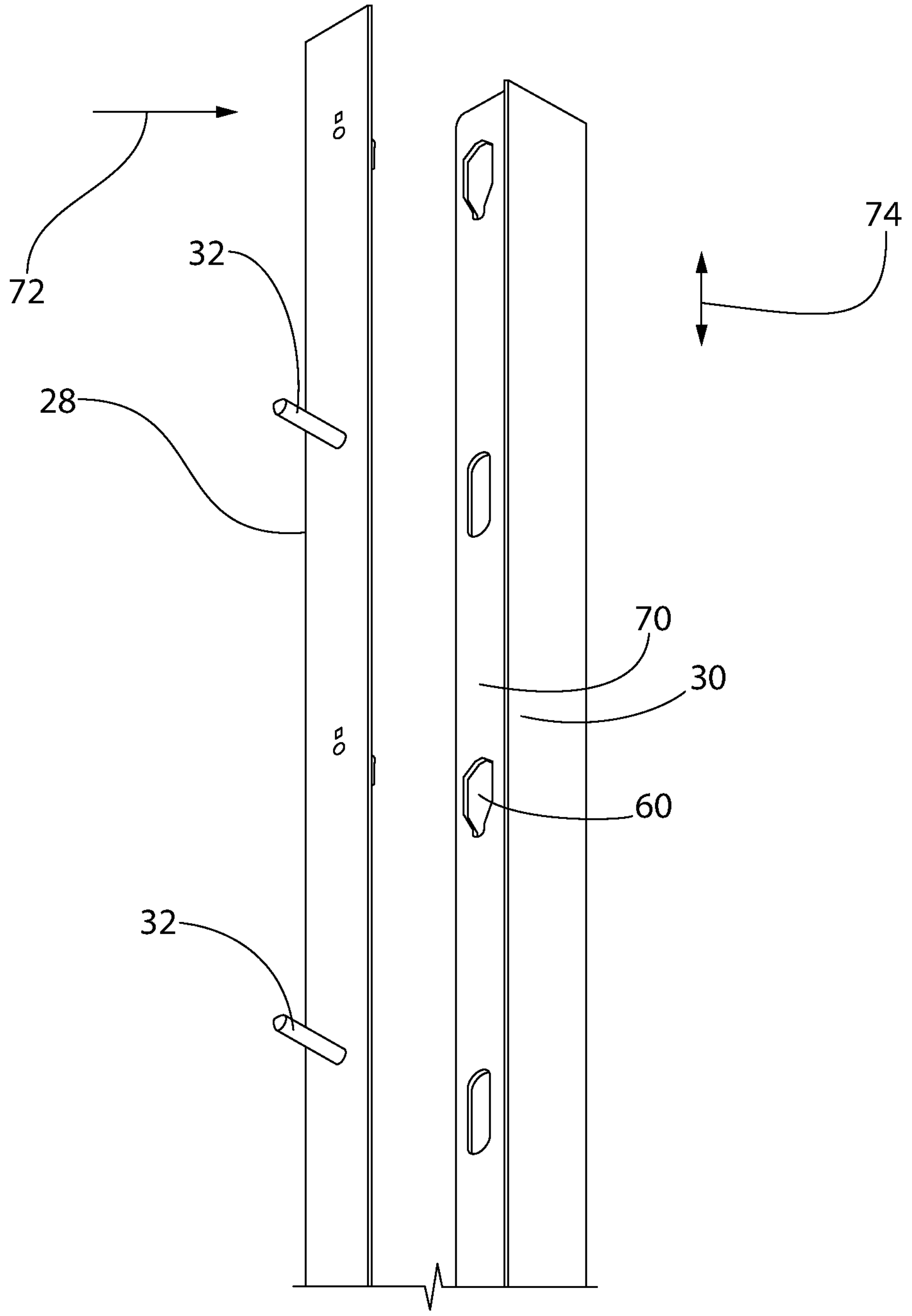
FIG. 5 is an exploded view of the guide of FIG. 1.
Figure 6:
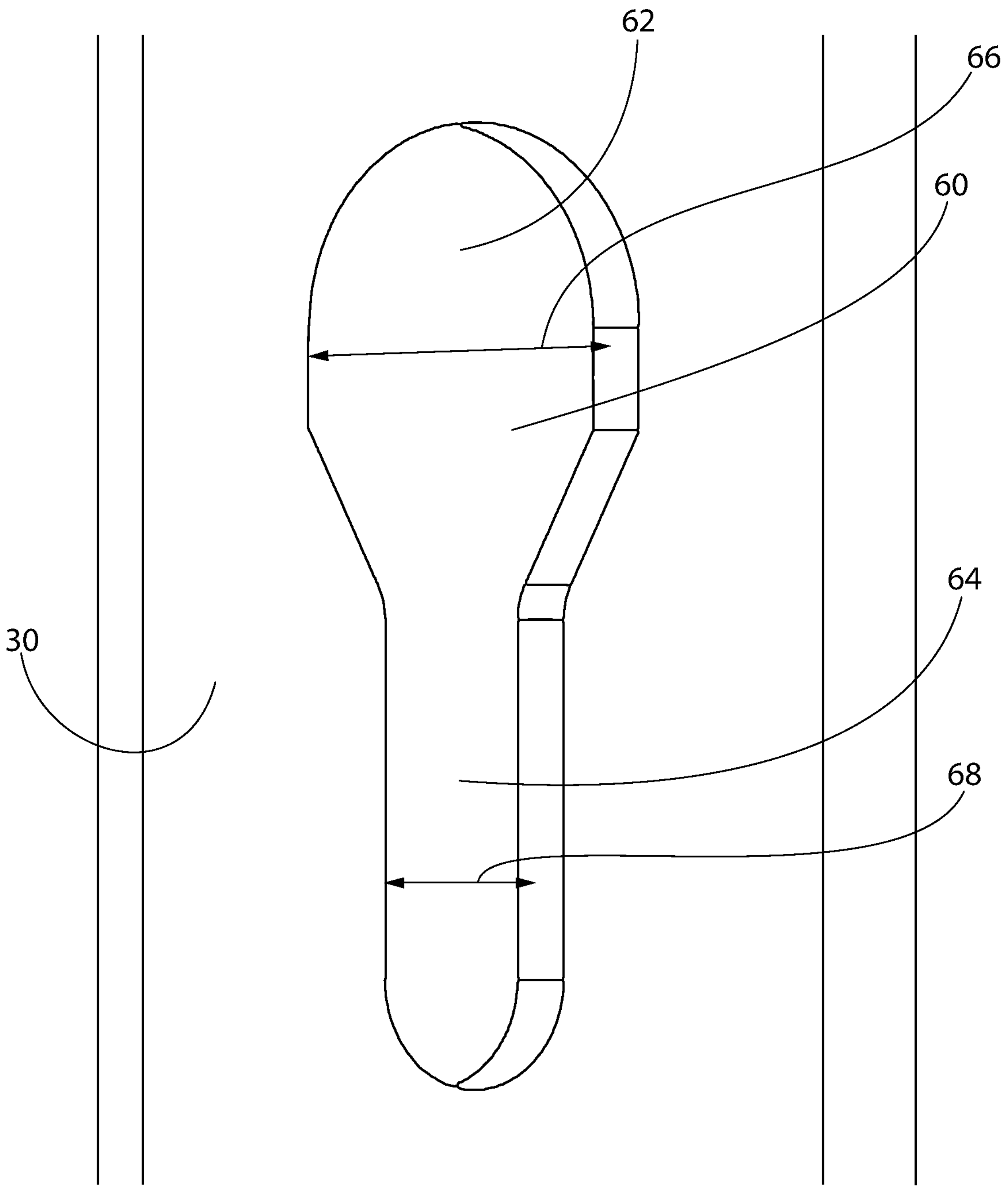
FIG. 6 is a close-up view of the second member of the guide of FIG. 1.

In one embodiment, the second member 30 includes an opening 60 configured to receive the coupling element 40 (FIGS. 3, 5-6). For example, in one embodiment the opening 60 includes a first portion 62 defined by a first portion width 66 (FIG. 6). In some embodiments, the first portion width 66 is selected such that the coupling element 40 can move through the first portion 62. In one embodiment, the opening 60 includes a second portion 64 defined by a second portion width 68. In one embodiment, the second portion width 68 is less than the first portion width 66. In one embodiment, the second portion width 68 is about 30% to about 60% of the first portion width 66. The second member 30 may include a first surface 70 which may be adjacent to, or abut, the first surface 54 of the first member 28 when the second member 30 is coupled to the first member 28, as explained in greater detail below.

In one embodiment, the first portion width 66 is greater than the head width 46 and the body width 48. In one embodiment, the second portion width 68 is greater than the body width 48 and less than the head width 46. In one embodiment, the body width 48 is less than the first portion width 66 and the second portion width 68. In one embodiment, the head width 46 is less than the first portion width 66 and the greater than the second portion width 68. In one embodiment, the second member 30 includes a plurality of openings 60 spaced (e.g., every 12 inches) along the length of the second member 30.

In one embodiment, the coupling element 40 is adapted to pass through the first portion 62 of the opening 60 as the first surface 70 of the second member 30 is moved adjacent to the first surface 54 of the first member 28. Referring to FIG. 5, in one embodiment, the second member 30 is configured to be moved in a first direction 72 relative to first member 28 such that the coupling element 40 passes through the opening 60 and the second member 30 is adjacent the first member 28 (FIG. 7). In one embodiment, the coupling element 40 passes through the first portion 62 of the opening 60 as the second member 30 is moved relative to the first member 28. In one embodiment, the body 42 of the coupling element is within the opening 60 when the first surface 54 of the first element 28 is adjacent the first surface 70 of the second member 30. In one embodiment, the second member 30 is adapted to be moved in a second direction 74 (e.g., vertically) such that the body 42 is moved from the first portion 62 of the opening 60 to the second portion 64. In one embodiment, the head 44 contacts the second member 30 thereby preventing movement of the second member 30 in the first direction 72 when the body 42 of the coupling element 40 is within the second portion 64 of the opening 60. In one embodiment, a fastener (not shown) may be coupled to at least one of the first member 28 and the second member 30 to prevent movement of the second member 30 in the second direction 74 such that the body 42 remains in the second portion 64 of the opening 60. In one embodiment, neither the coupling element 40, nor the anchor 32, are visible from outside of the guide 20 when the first member 28 is coupled to the second member 30. In some embodiments, the second portion 64 of the opening 60 is above the first portion 62. In other embodiments, the first portion 62 is above the second portion 64. The second direction 74 may be selected depending on which of the first portion 62 and the second portion 64 is above the other portion. In other embodiments, the second member 30 may move horizontally or diagonally relative to the first member 28 to move the coupling element 40 from the first portion 62 to the second portion 64 of the opening 60. In one embodiment, the first member 28 includes a plurality of coupling elements 40, the second member 30 includes a plurality of openings 60 and the plurality of coupling elements 40 are simultaneously moved from the first portion 62 to the second portion 64 of the plurality of openings 60.

In one embodiment, first member 28 and second member 30 are configured to form a channel 76 when assembled together. In one embodiment, a portion of the first member 28 and a portion of the second member 30 are separated by a channel 76 when the second member 30 is coupled to the first member 28 (FIG. 7). The channel 76, in one embodiment, is configured to receive a portion of the closure 22 (e.g, a side edge of the closure). In one embodiment, the closure 22 is adapted to move between the open position and the closed position while a portion of the closure 22 is within the channel 76. In one embodiment, the channel 76 has a width 78 of about 0.25 inches to about 1 inch. In one embodiment, the width 78 of the channel 76 may be selected to receive a closure 22 having a width of about 0.125 inches to about 0.75 inches. In one embodiment, the channel 76 extends the length of the guide 20. In one embodiment, the guide 20 defines an interior space 58 adapted to receive a wind lock, as explained in greater detail below. In one embodiment, the interior space 58 has a greater width than the channel 76. Channel 72 may be defined by a free end segment of first member 28 and a free end segment of second member 30. For example, an end portions of first member 28 and an end portion of second member 30 may be bent to form substantially parallel segments of first member 28 and second member 30 that define channel 76 when the substantially parallel segments aligned (e.g., when first member 28 is mated with second member 30. In one embodiment, first member 28 and second member 30 includes opposing bends (e.g., third segment 88 and fifth portion 108). Opposing bends may facilitate the insertion of closure 22 through channel 76.

Referring to FIG. 2, in one embodiment, the first member 28 includes a first segment 80. In one embodiment, the coupling element 40 is coupled to the first segment 80 disposed along a first plane 82. In one embodiment, the first member 28 includes a second segment 84 disposed along a second plane 86. In one embodiment, the second plane 86 is transverse to the first plane 82. In one embodiment, the first member includes a third segment 88 disposed along a third plane 90. In one embodiment, the third plane 90 is transverse to the second plane 86. In one embodiment, the first plane 82 is parallel to the third plane 90. In one embodiment, the second plane 86 is perpendicular to at least one of the first plane 82 and the third plane 90. In one embodiment, the third segment 88 is a sidewall of the channel 76.

Referring to FIG. 3, in one embodiment, the second member 30 includes a first portion 92 disposed along a first portion plane 94. In one embodiment, the first portion 92 includes the opening 60. In one embodiment, the second member 30 includes a second portion 96 disposed along a second portion plane 98. In one embodiment, the second portion plane 98 is transverse to the first portion plane 94. In one embodiment, the second portion plane 98 is perpendicular to the first portion plane 94. In one embodiment, the second member 30 includes a third portion 100 disposed along a third portion plane 102. In one embodiment, the third portion plane 102 is transverse to the second portion plane 98. In one embodiment, the third portion plane 102 is perpendicular to the second portion plane 98. In one embodiment, the third portion plane 102 is parallel to the first portion plane 94. In one embodiment, the second member 30 includes a fourth portion 104 disposed along a fourth portion plane 106. In one embodiment, the fourth portion plane 106 is transverse to at least one of the third portion plane 102 and the first portion plane 94. In one embodiment, the fourth portion plane is perpendicular to at least one of the third portion plane 102 and the first portion plane 94. In one embodiment, the fourth portion plane 104 is parallel to the second portion plane 98. In one embodiment, the second member 30 includes a fifth portion 108 disposed along a fifth portion plane 110. In one embodiment, the fifth portion plane 110 is transverse to at least one of the fourth portion plane 106 and the second portion plane 98. In one embodiment, the fifth portion plane 110 is perpendicular to at least one of the fourth portion plane 106 and the second portion plane 98. In one embodiment, the fifth portion plane 110 is parallel to at least one of the first portion plane 94 and the third portion plane 102. In one embodiment, the channel 76 is defined by the fifth portion 108 and the third segment 88.

In one embodiment, shown in FIGS. 8-11, the second member 30 includes a ramp 112 adapted to increase the friction between the second member 30 and the coupling element 40. For example, the ramp 112 may include an angled surface 114 which is angled relative to a second surface 116 of the second member 30. In one embodiment, friction between the ramp 112 and the coupling element 40 further secures the first member 28 to the second member 30. The ramp 112 may be fixed to the second member 30 (e.g., by adhesive, welding, threaded connector, or rivet). In one embodiment, the ramp 112 and the second member 30 are a unitary construct. In one embodiment, each of the first member 28 and the second member 30 include a ramp 112 that engage each other as the second member 30 is moved relative to the first member 28. In one embodiment, the ramp 112 includes a rear surface 118 adapted to be adjacent the second surface 116 of the second member 30 when the ramp 112 is coupled to the second member 30. In one embodiment, the ramp 112 includes a front surface 120 configured to engage the head 44 of the coupling element 40 as explained in greater detail below. In one embodiment, an angle 122 between a plane including the front surface 120 and a plane including the angled surface 114 is about 150 degrees to about 165 degrees.

In one embodiment, the ramp 112 includes a sidewall 124 which defines a trough 126. In one embodiment, the trough 126 has a shape similar to that of the second portion 64 of the opening 60. In one embodiment, the trough 126 and the second portion 64 are aligned when the ramp 112 is coupled to the second member 30. In one embodiment, the body 42 of the coupling element 40 is configured to move along the trough as the second member 30 is moved in the second direction 74 when the first member 28 and second member 30 are in a coupling orientation. In some embodiments, the body length 50 is fixed, such that as the head 44 moves along the angled surface 114, the second member 30 is drawn closer to the first member 28 and the friction force between the head 44 of the coupling element and the ramp 112 increases. In some embodiments, the friction between the head 44 and the ramp 112 resists movement of the second member 30 in the second direction 74.

Figure 12:
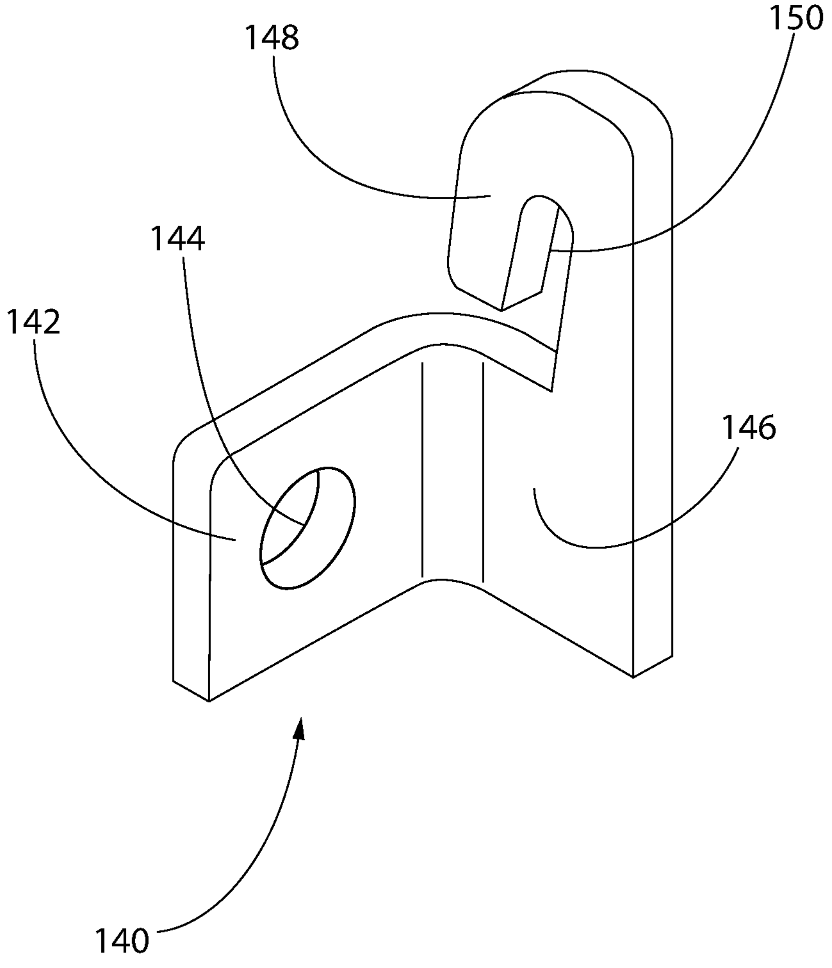
FIG. 12 is a top, front, left-side perspective view of a coupling element in accordance with another exemplary embodiment of the present invention.
Figure 13:
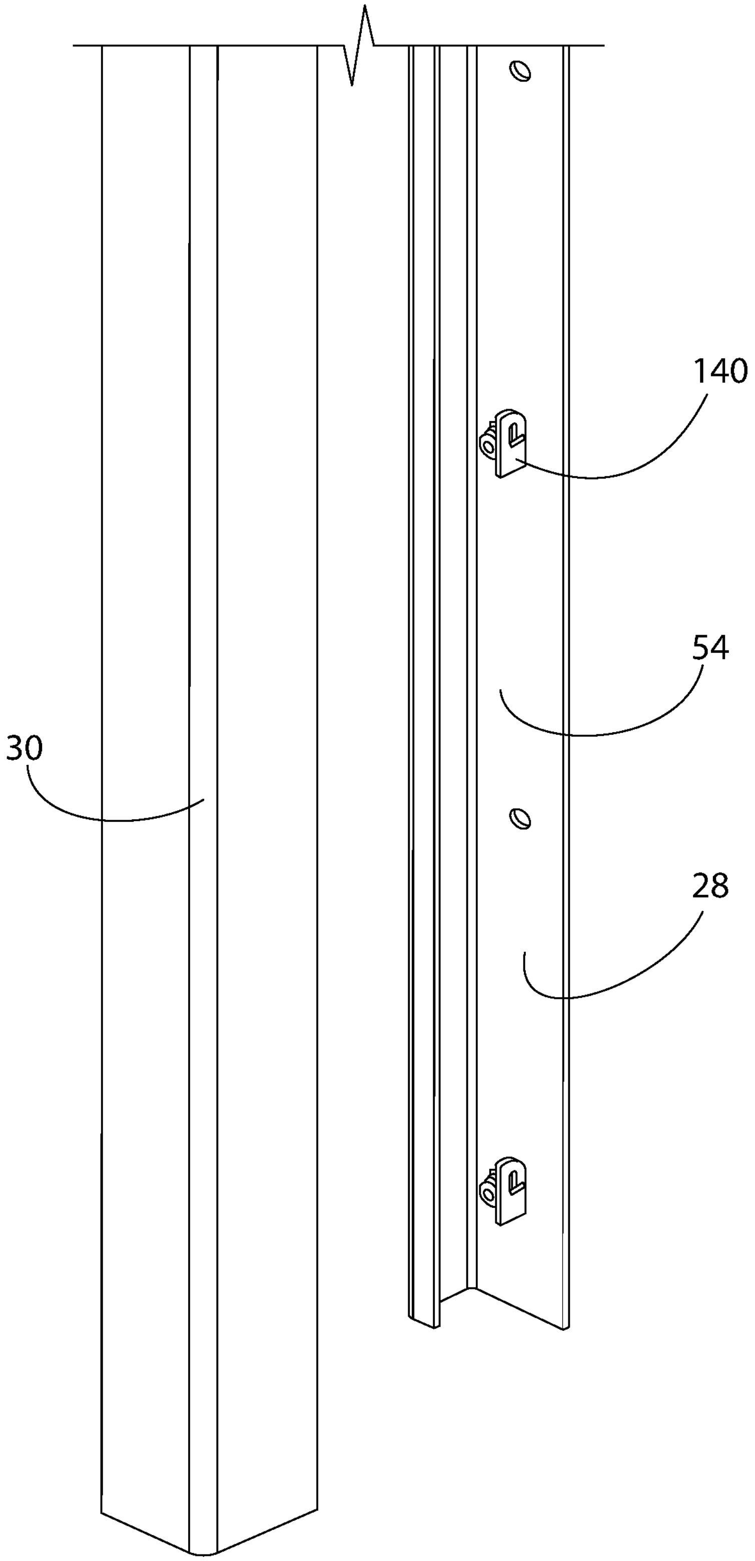
FIG. 13 is an exploded view of the guide of FIG. 1 with the coupling element of FIG. 12.

Referring to FIGS. 12-13, one embodiment of a coupling element, generally designated 140, is shown. In one embodiment, the coupling element 140 is adapted to couple the first member 28 to the second member 30. In one embodiment, the coupling element 140 includes a first piece 142 adapted to be positioned adjacent the first surface 54 of the first member 28. In one embodiment, the coupling element 140 includes an opening 144 adapted to receive the fastener 52 to secure the coupling element 140 to the first member 28. In one embodiment, the coupling element 140 includes a second piece 146. In one embodiment, the second piece 146 is transverse to the first piece 142. In one embodiment, the second piece 146 stands proud of the first surface 54 when the coupling element 140 is coupled to the first member 28 (FIG. 13). In one embodiment, at least a portion of the second piece 146 extends through the opening 60 when the second member 30 is coupled to the first member 28. In one embodiment, the coupling element 140 includes an arm 148. In one embodiment, the arm 148 is cantilevered from the second piece 146 and a space 150 may separate a portion of the arm 148 from the second piece 146. In one embodiment, the arm 148 is deflectable from a relaxed state where the space 150 has a first width to a contracted state where the space 150 has a second width different than the first width. In one embodiment, the first width is greater than the second width. In one embodiment, the arm 148 contacts the second surface 116 of the second member 30 as the second member moves in the second direction 74. In one embodiment, the arm 148 is deflected from the relaxed state to the contracted state as the arm 148 comes into contact with the second surface 116 of the second member. In one embodiment, the coupling element 140 is manufactured from sheet metal (e.g., aluminum, steel, or stainless steel). In one embodiment, the arm 148 moves from the relaxed state to the contracted state as the arm 148 contacts the second member 30.

Figure 14:
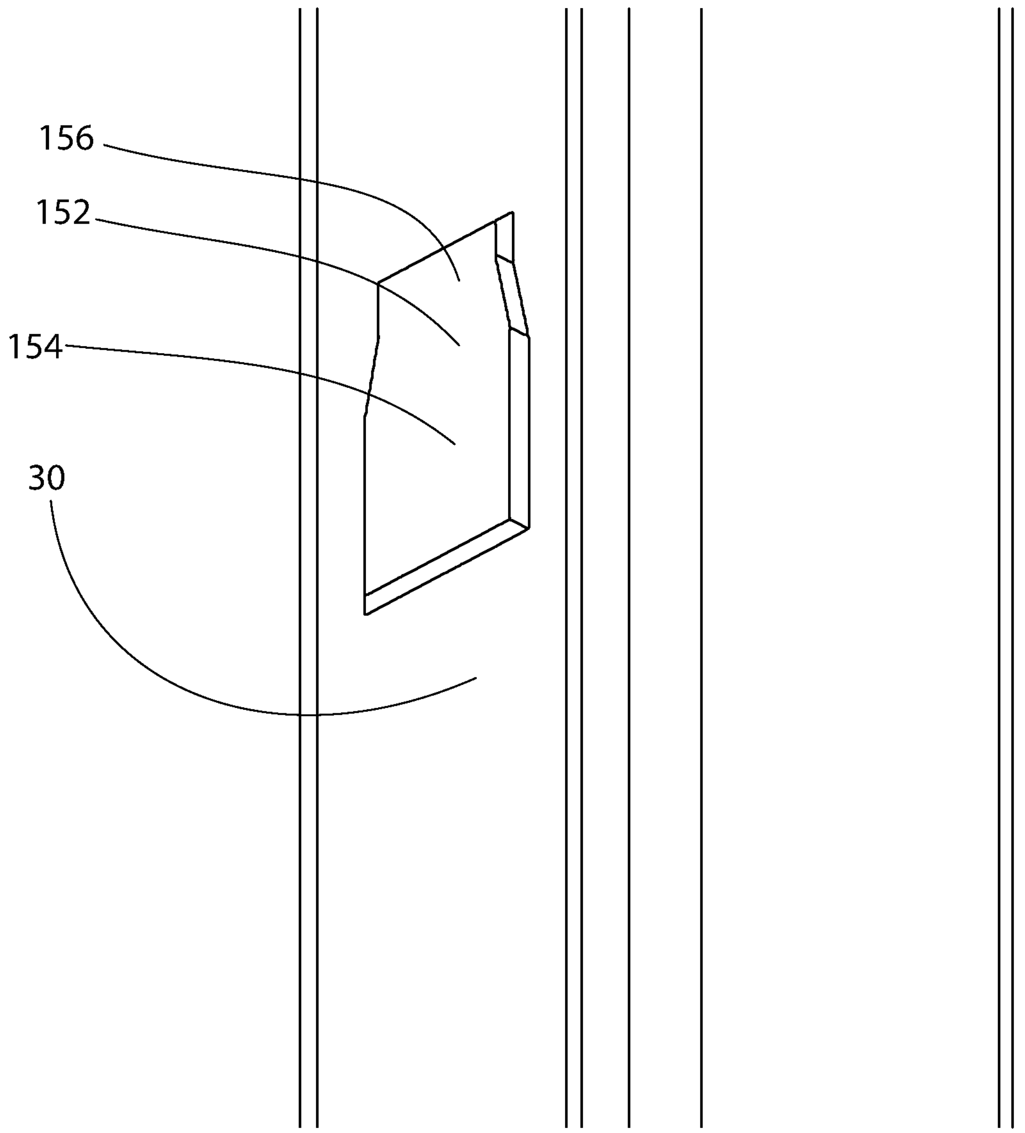
FIG. 14 is a close-up view of the second member of FIG. 1 with an opening in accordance with another exemplary embodiment of the present invention.

Referring to FIG. 14, a second embodiment of an opening 152 is shown. In one embodiment, the opening 152 includes a first portion 154 and a second portion 156, which may be analogous to first portion 62 and second portion 64 of opening 60 as previously described. However, the first portion 154 and the second portion 156 include a polygonal (e.g., rectangular) shape rather than the arcuate portion of a circle shape of the first portion 62 and second portion 64.

Referring to FIGS. 15-17, the guide 20, in one embodiment, may be coupled to a substrate 158. For example, the substrate 158 may be a structural column (e.g., a steel beam as shown in FIG. 15), a wall surface (e.g., the wall of a building as shown in FIG. 16), or a jamb (e.g., a steel beam as shown in FIG. 17). In some embodiments, (e.g., the embodiments shown in FIGS. 15-17), the guide 20 may be coupled to a variety of surfaces or structures but the coupling element 40 and the anchor 32 remain out of sight from outside of the guide 20.

Figure 18:
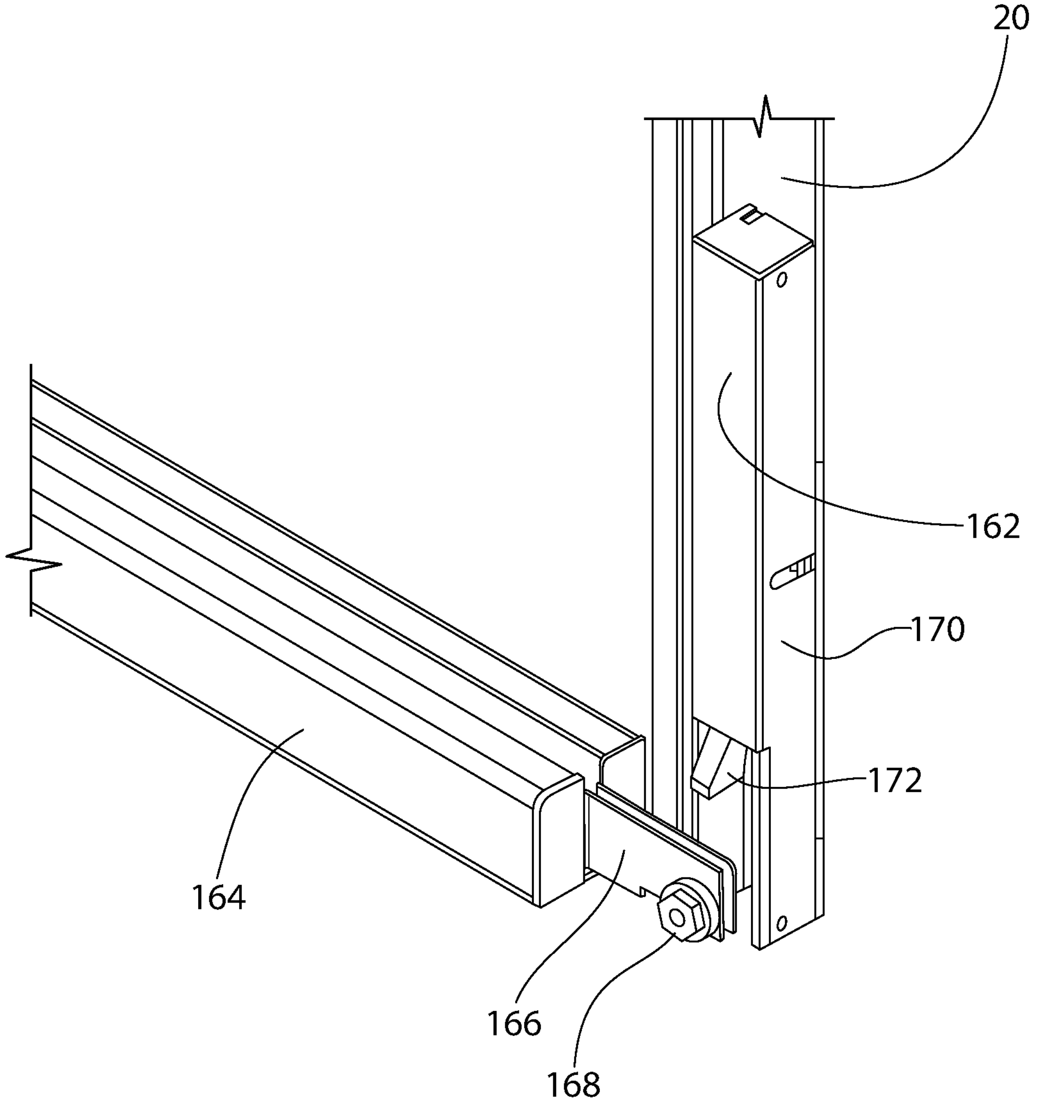
FIG. 18 is a top, front, right-side perspective view of a bottom bar and a sectional view of the guide of FIG. 1.
Figure 19:
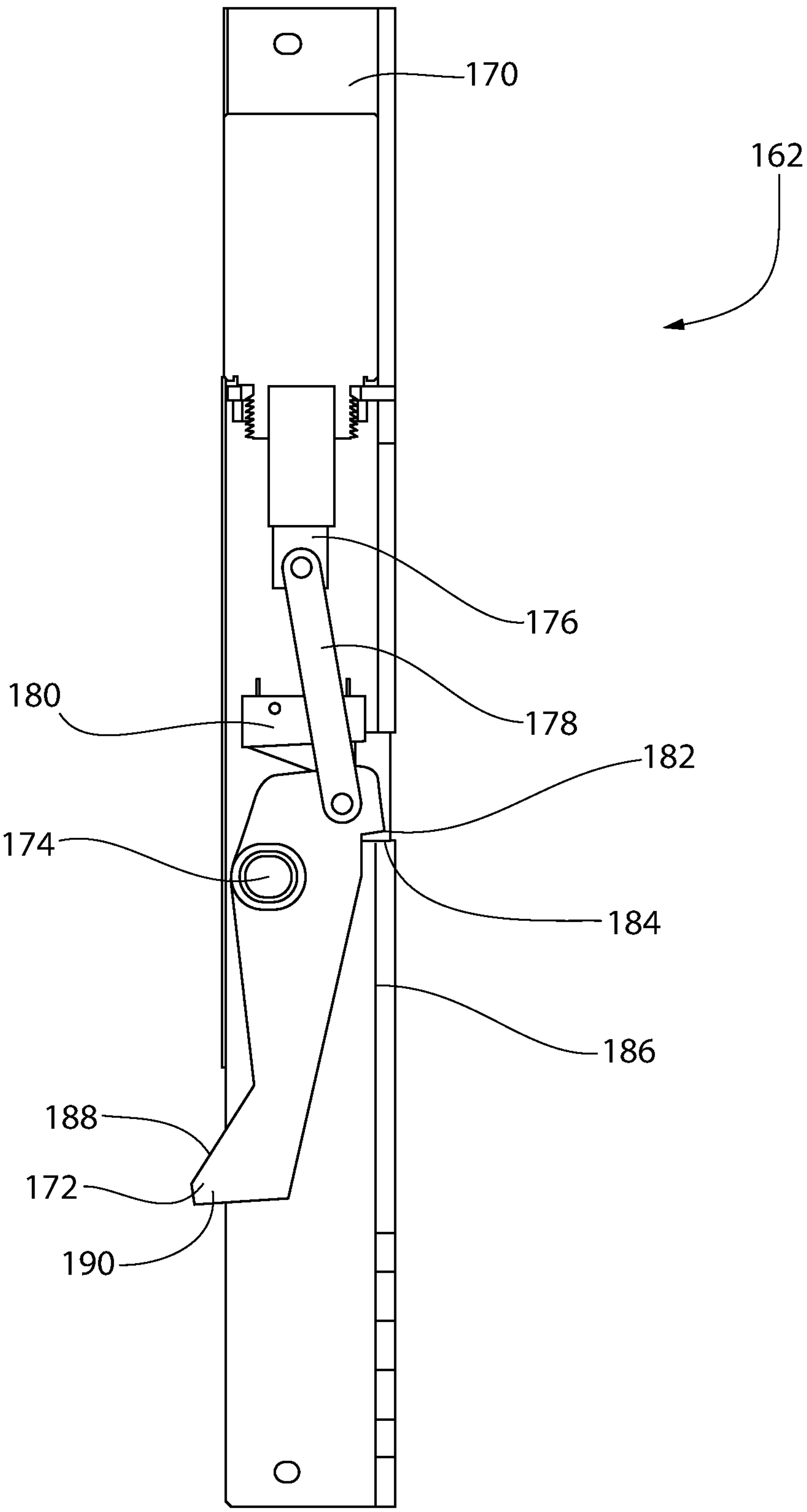
FIG. 19 is a sectional view of the housing of FIG. 18.

In one embodiment, the guide 20 includes a lock. One type of lock contemplated for use with the guide 20 is disclosed in U.S. Pat. No. 6,834,464, the entire contents of which are hereby incorporated by reference herein. In one embodiment, the lock is an auto lock 162 (FIG. 18). In one embodiment, the closure 22 includes a bottom bar 164. In one embodiment, the bottom bar 164 is fixed to the bottom of the closure 22 (closure not shown in FIG. 18) to provide rigid structure to the bottom of the flexible closure 22. In one embodiment, the bottom bar 164 includes an extension 166 adapted to be positioned within the channel 76 of the guide 20 when the first member 28 is coupled to the second member 30. In one embodiment, the extension 166 is moveable from a first position at least partially within the bottom bar 164 to a second position at least partially outside of the bottom 164. In one embodiment, the extension 166 is at least partially within the channel 76 when the extension 166 is in the second position. In one embodiment, a bearing 168 is coupled to the extension 166. In one embodiment, the bearing 168 is configured to resist removal of extension 166 from channel 76. In one embodiment, the bearing 168 includes a thickness that is greater than the channel width 78 such that the bearing 168 prevents the removal of the extension 166 from the channel 76. In one embodiment, the bearing 168 is fixed to the extension 166 (e.g., by adhesive, welding, or threaded coupling). In one embodiment, the bearing 168 includes a nut and bolt which are coupled to the extension 166.

In one embodiment, the auto lock 162 includes a housing 170 adapted to be positioned within the guide 20 (FIGS. 17-20). In one embodiment, a pawl 172 extends from the housing 170 and is adapted to prevent movement of the closure 22 from the closed position to the open position by blocking the path of the extension 166. In one embodiment, the pawl 172 is rotatably coupled to an axle 174 and the axle 174 is coupled to the housing 170. In one embodiment, the pawl 172 is rotatable about the axle 174 from a first position where the pawl 172 is within (or substantially within) the housing 170 to a second position where at least a portion (or at least a greater portion) of the pawl 172 is outside of the housing 170 (FIG. 18). In one embodiment, the pawl 172 is adapted to be rotated by an actuator 176 (e.g., a piston within a cylinder, an electric motor, or a manually powered actuator). In one embodiment, the actuator 176 is a solenoid (e.g., McMaster Carr Part #9719K22, 24 Volt solenoid). In one embodiment, a link 178 is coupled to each of the actuator 176 and the pawl 172 such that linear motion of the actuator 176 is translated into rotation of the pawl 172 about the axle 174. In one embodiment, the actuator 176 moves vertically (e.g., along the length of the guide 20) thereby causing rotation of the pawl 172. In one embodiment, an actuator 176 which moves vertically rather than horizontally allows the actuator to have a longer range of motion which may be translated into a mechanical advantage as the to rotate the pawl 172 about the axle 174. In one embodiment, the length of linear travel of the actuator is about 0.25 inches to about 0.5 inches. In one embodiment, the pawl 172 is adapted to rotate about 15 degrees to about 30 degrees when the actuator 176 moves from a retracted position to an extended position. In one embodiment, the auto lock 162 includes a sensor 180 (e.g., a micro switch, a contact sensor, or an optical sensor) adapted to sense the position of the pawl 172.

In one embodiment, the pawl 172 includes a shoulder 182 adapted to engage the housing 170 when the pawl 174 is in the second position. In one embodiment, for example, shoulder 182 is adapted to engage a fulcrum (e.g., a shelf) of housing 170. In one embodiment, the shoulder 182 is brought into contact, or positioned adjacent to, the fulcrum (e.g., shelf 184) as the actuator 176 moves from the retracted position to the extended position. In one embodiment, a wall 186 of the housing 170 includes the fulcrum (e.g., shelf 184).

In one embodiment, the pawl 172 includes a cam surface 188 such that the extension 166 can move the pawl 172 from the second position to the first position when the extension 166 contacts the cam surface 188 as the closure 22 moves from the open position to the closed position. In one embodiment, the extension 166 contacts a bottom surface 190 of the pawl 172 when the pawl 172 is in the second position, and a user attempts to move the closure 22 from the closed position to the open position. In one embodiment, the pawl 172 is rotated about the axle 174 as the extension 166 contacts the bottom surface 190. In one embodiment, the pawl 172 rotates until the shoulder 182 contacts the shelf 184. In one embodiment, the force of resistance to rotation provided by the shoulder 182 in contact with the shelf 184 is about 500 pounds to about 1,000 pounds.

Figure 20:
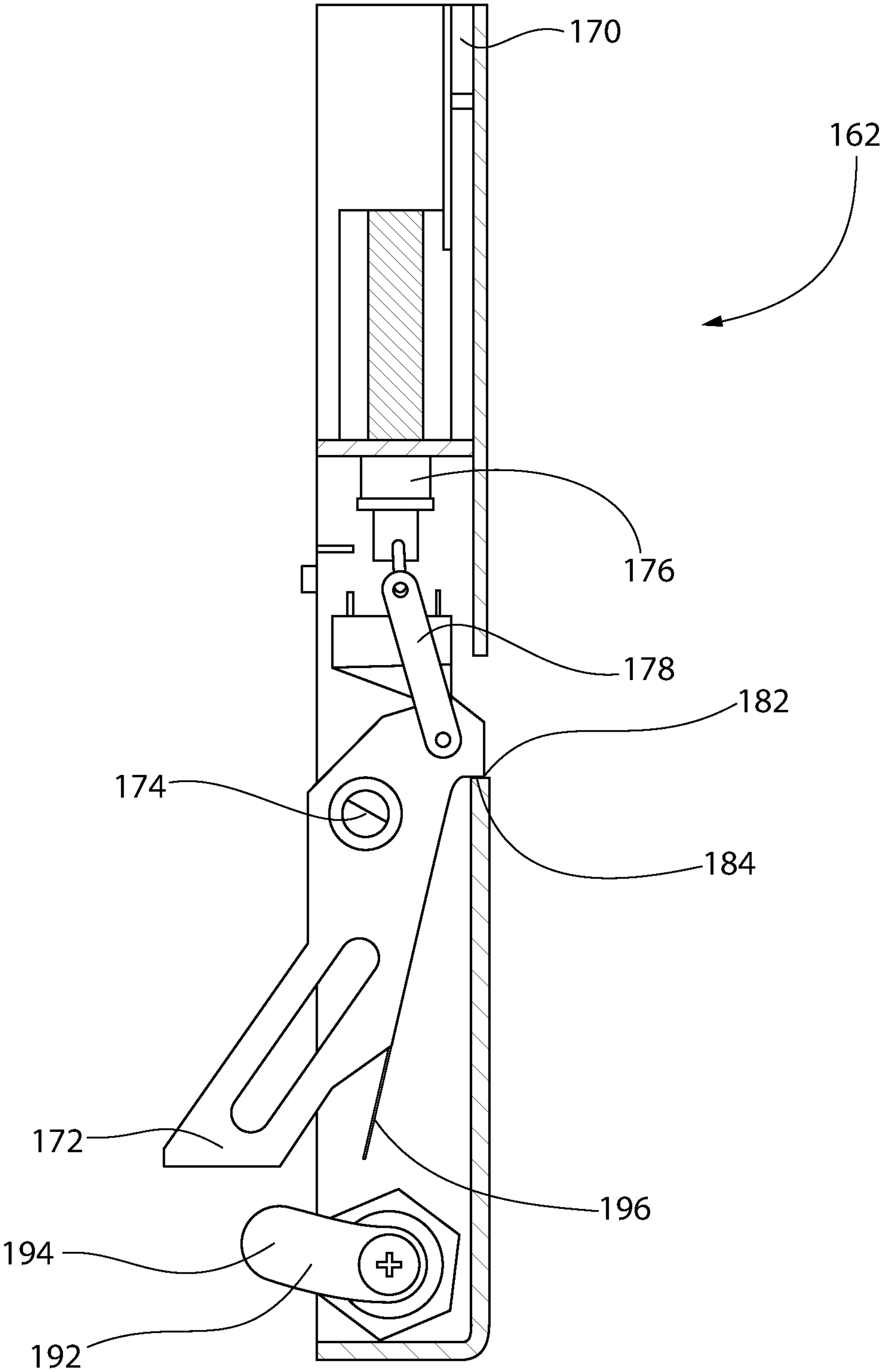
FIG. 20 is a sectional view of a housing in accordance with another exemplary embodiment of the present invention.
Figure 21:
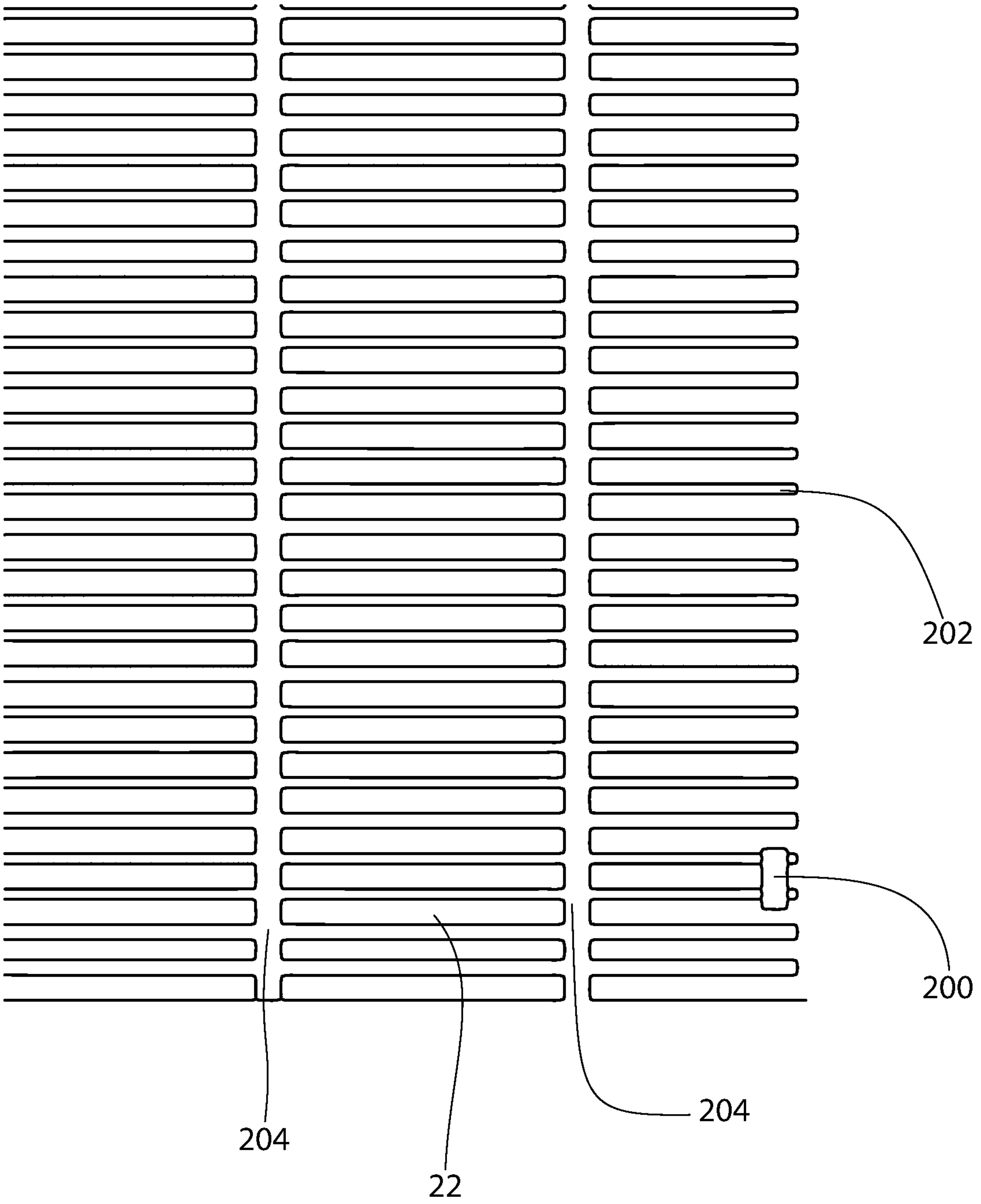
FIG. 21 is a front view of a closure with a wind lock attached in accordance with another exemplary embodiment of the present invention.

Referring to FIG. 20, in one embodiment, the auto lock 162 includes a manual unlock 192. In one embodiment, the manual unlock 192 is adapted to be rotated by a lever. In another embodiment, the manual unlock 192 is adapted to be rotated by a key such that only a person with the key will be able to override the auto lock 162. In one embodiment, the manual unlock 192 includes a paddle 194 adapted to engage pawl 172 such as by engaging a lever 196 coupled to the pawl 172. In one embodiment, the paddle 194 contacts the lever 196 by movement of the manual unlock 192, such as the rotation of manual unlock 192. In one embodiment, the pawl 172 is rotated from the second position to the first position as the manual unlock 192 continues to be moved after paddle 194 engages paw 172 (e.g., to rotated after the paddle 194 engages the lever 196). In one embodiment, the actuator 176 is selected such that the manual unlock 192 can rotate the pawl 172, thereby moving the actuator 176 from the extended position to the retracted position.

In one embodiment, the actuator 176 is in the retracted position when power to the actuator 176 is lost (e.g., fail safe). In one embodiment, the actuator 176 is in the extended position when power to the actuator 176 is lost (e.g., fail secure).

In one embodiment, the closure 22 includes a wind lock 200 adapted to prevent removal of the portion of the closure 22 from the guide 20 (FIGS. 21-24). In one embodiment, the closure 22 comprises a grille having a plurality of rods 202 extending in a first direction and one or more ties 204 extending in a second direction transverse to the first direction. In one embodiment, the wind lock 200 is coupled to one or more rods 202. In one embodiment, the rods 202 have a diameter of about 0.05 inches to about 0.5 inches. In one embodiment, the closure 22 is flexible such that the closure 22 can be coiled about itself for storing. In one embodiment, such as where the closure includes a plurality of rods extending across an opening to and/or through opposing guides, the length of one or more selected rods are shorter to better fit with the wind locks when the closure is coiled about itself. In some embodiments, rods fixed to the wind lock(s) (fixed rods) extend further into the guide than free rods (those rods that are not fixed to wind locks). In one embodiment, a plurality of free rods extend substantially between the guides, but do not enter the guides while a plurality of fixed rods extend into the guides.

Figure 22:
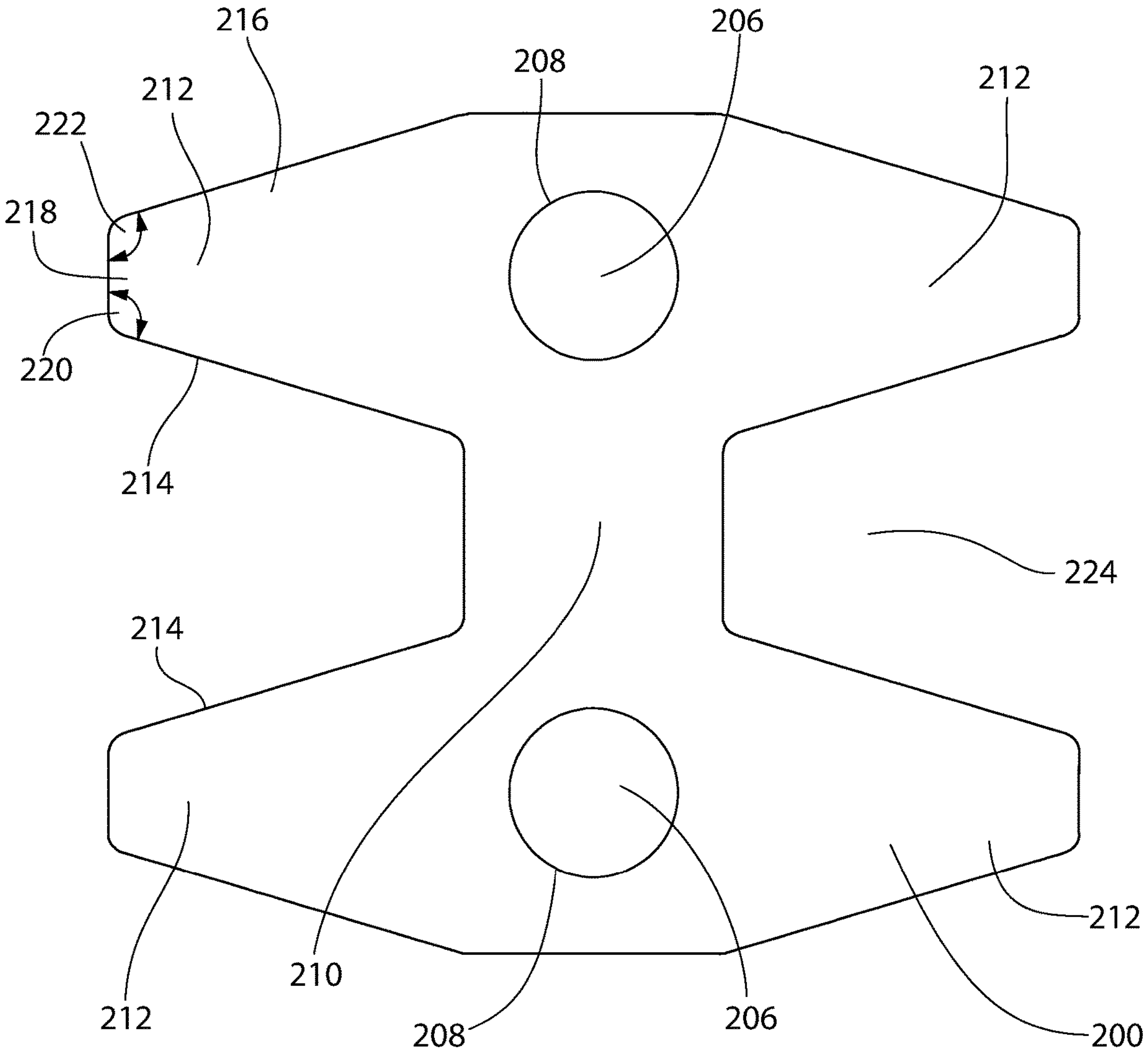
FIG. 22 is a front view of the wind lock of FIG. 21.

In one embodiment, the wind lock 200 includes an aperture 206 defined by a sidewall 208 (e.g., as shown in FIG. 22). Although the embodiment shown in FIG. 22 includes two apertures 206, any number of apertures could be incorporated into a wind lock, including 1, 2, 3, 4, or 5 apertures. In one embodiment, the aperture 206 is adapted to receive a rod 202. In one embodiment, the apertures 206 have a diameter of about 0.75 inches to about 0.188 inches. In one embodiment, the wind lock 200 includes a body 210 and the apertures 206 extend through the body 210. In one embodiment, the wind lock 200 includes one or more flanges 212 protruding from the body 210. In one embodiment, the flanges 212 are adapted to fit in the space between the rods 202 of a subjacent layer when the closure 22 is coiled about itself in the closed position. In one embodiment, an end of the flanges 212 have a thickness of about 0.15 inches to about 0.5 inches. In one embodiment, the flanges 212 are tapered as they extend away from the body 210. In one embodiment, the tapered shape of the flanges 212 facilitate the flanges being positioned in the space between the rods 202 as the closure 22 coils about itself as it moves from the open position to the closed position.

Figure 24:
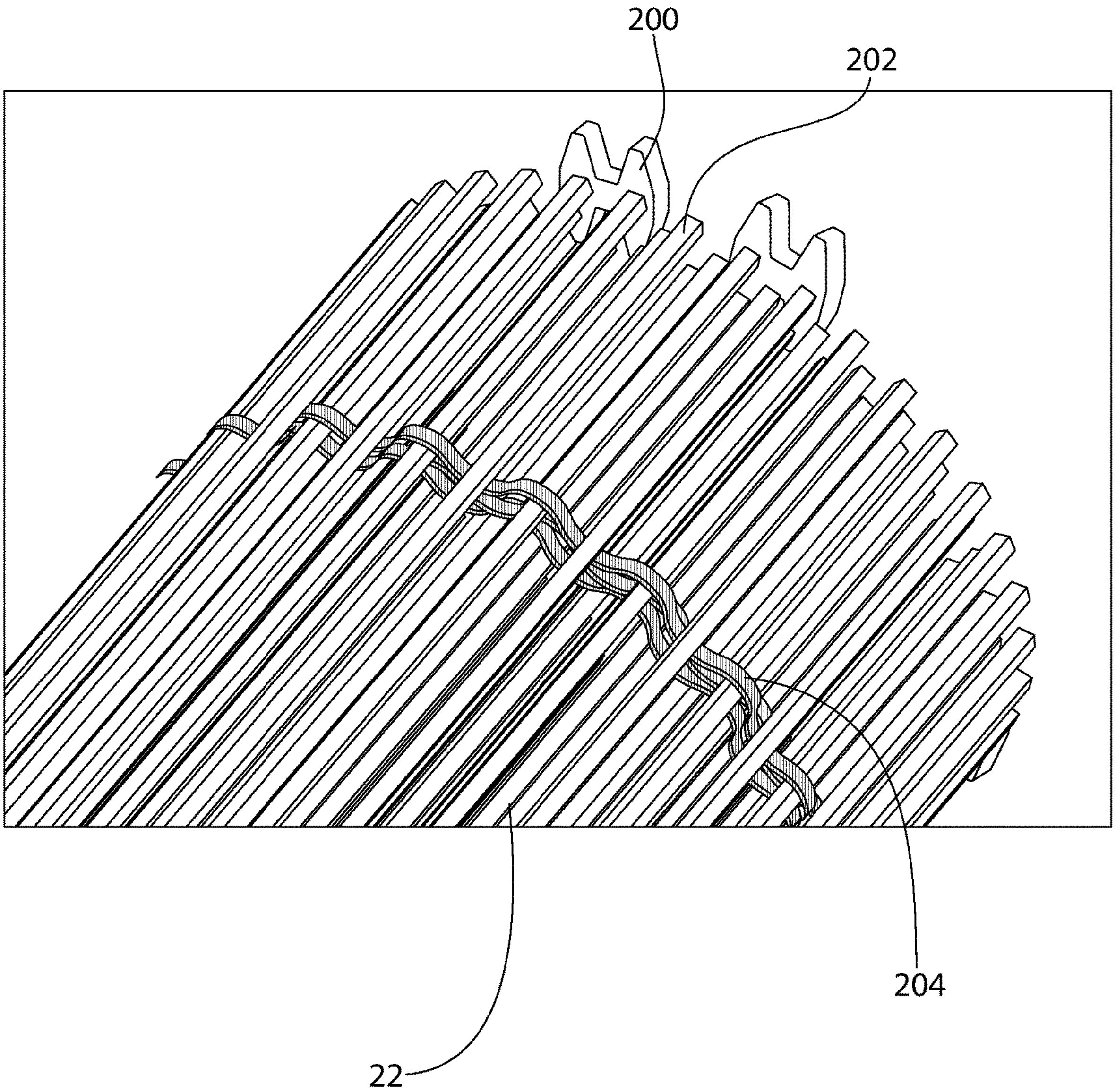
FIG. 24 is a front view of the closure and wind lock of FIG. 21 in a coiled state.

In one embodiment, the flanges 212 include an inner wall 214, an outer wall 216, and an end wall 218. In one embodiment, the inner wall 214 is positioned at an inner angle 220 relative to the end wall 218. In one embodiment, the outer wall 216 is positioned at an outer angle 222 relative to the end wall 218. In one embodiment, the inner angle 220 is equal to or greater than the outer angle 222. In one embodiment, the inner angle 220 is less than or equal to the outer angle 222. In one embodiment, at least one of the inner angle 220 and the outer angle 222 are about 70 degrees to about 120 degrees. In one embodiment, the wind lock 200 includes a space 224 between the flanges 212. In one embodiment, wind lock 200 includes a space on a front side and a back side of wind lock 200. In one embodiment, the space 224 is adapted to receive a rod 202 when the closure is in the closed position (FIG. 24). Space 224 may be defined by tapered edges of flanges 212 such that surfaces of adjoining flanges diverge from the interior of wind lock 200 to an exterior of wind lock 200. In one embodiment, a wind lock 200 with flanges 212 that are received in the spaces between the rods 202 facilitates more compact nesting when the closure 22 is in the closed position than a closure with flanges that do not fit in the spaces between the rods. In one embodiment, the flanges 212 have a length which is greater than the channel width 78. In one embodiment, the wind lock 200 is positioned within the interior space 58 (FIG. 7) of the guide 20 such that the wind lock 200 prevents the end of the closure from being removed from the guide 20. In one embodiment, the wind lock 200 is configured to engage the guide (e.g., the third segment 88 and the fifth portion 108) when a force is applied to the closure 22 (e.g., a force transverse to direction of movement of the closure as the closure moves between the open and closed position).

Figure 23:
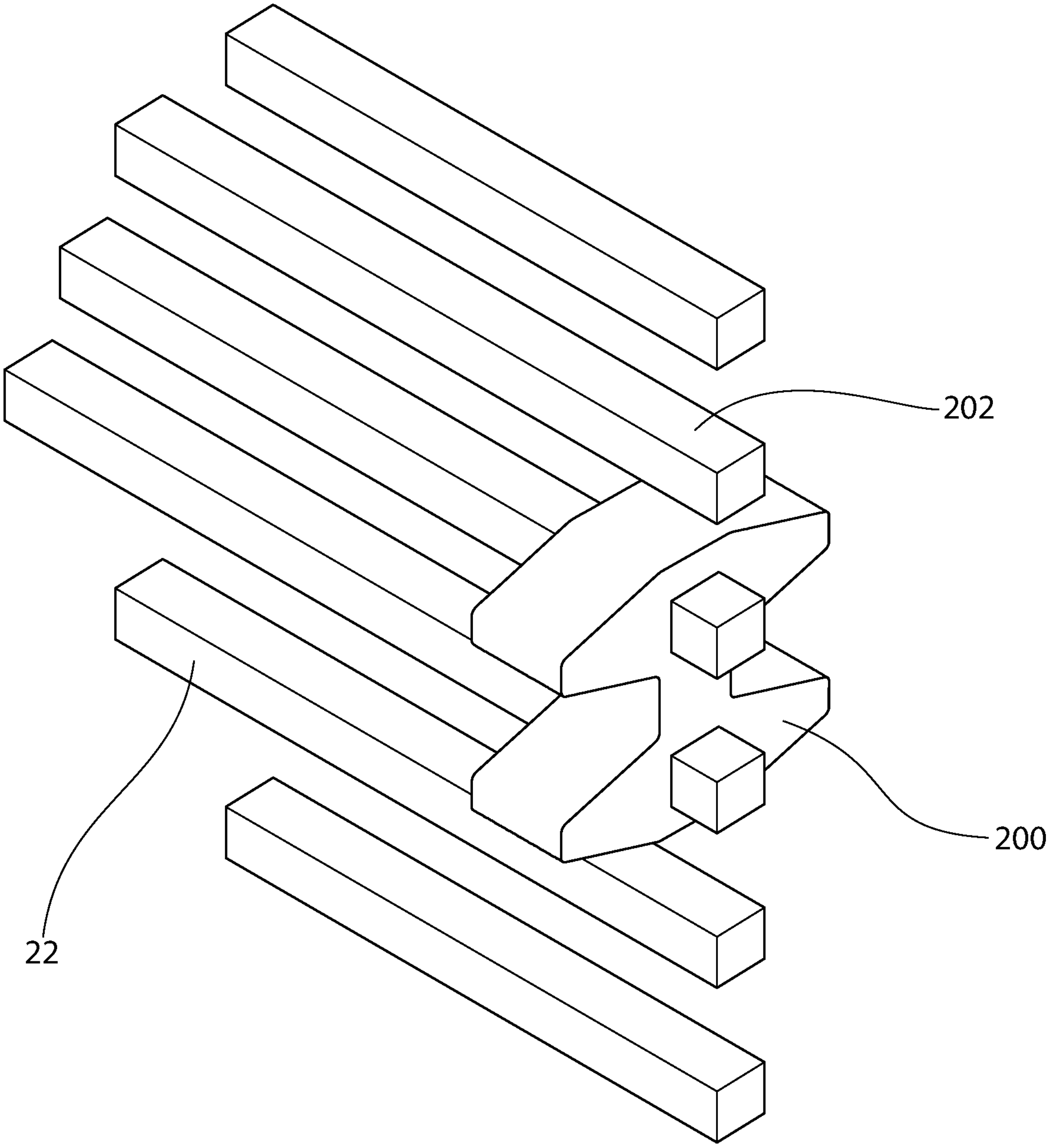
FIG. 23 is a top, front, right-side close-up perspective view of the closure and wind lock of FIG. 21.

In one embodiment, the wind lock 200 is coupled to the closure 22 when the rods 202 are within the apertures 206 (FIG. 23). In one embodiment, the rods 202 are configured to be fixed to wind lock 200 when the rods 202 are within the apertures 206 (e.g., via welding or adhesive). In one embodiment, an end of the rods 202 are configured to be bent (e.g., at an angle of about 90 degrees) after the rod is within the aperture 206 such that the bend in the rod 202 prevents decoupling from the wind lock 200. In one embodiment, an end of the rod 202 is adapted to be compressed to create a bulge (e.g., mushroomed). In one embodiment, the wind lock 200 is spaced from one or both of the lateral edges of the closure 22. In one embodiment, the wind lock 200 is space about 0.05 inches to about 0.5 inches from the lateral edge of the closure 22. In one embodiment, the wind lock 200 is fixed to the closure 22 by adhesive or weld after the rods 202 are within the apertures.

Figure 25:
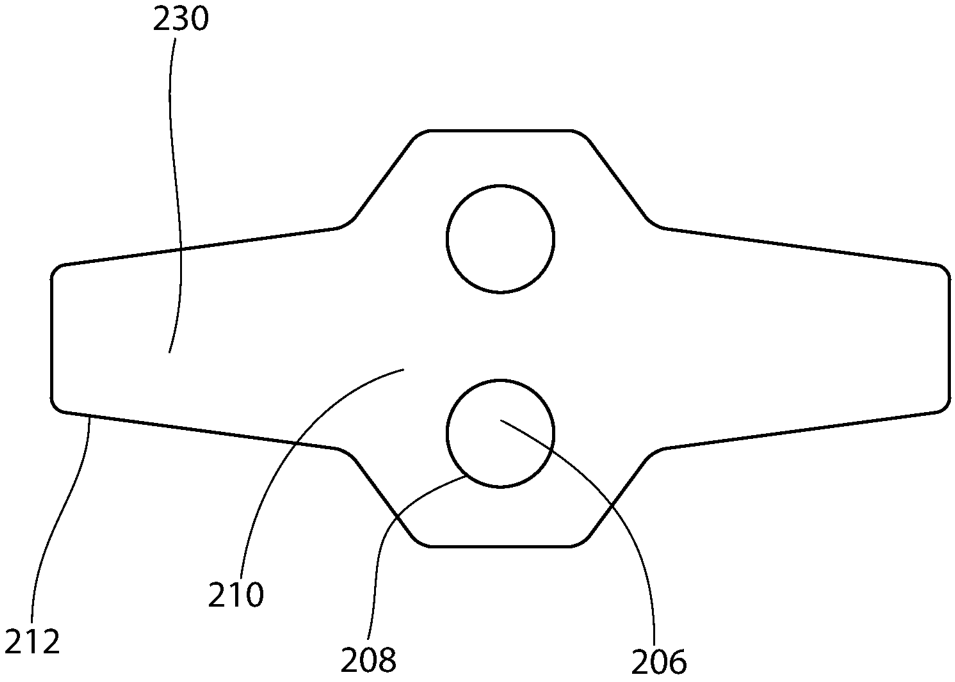
FIG. 25 is a front view of a wind lock in accordance with another exemplary embodiment of the present invention.
Figure 26:
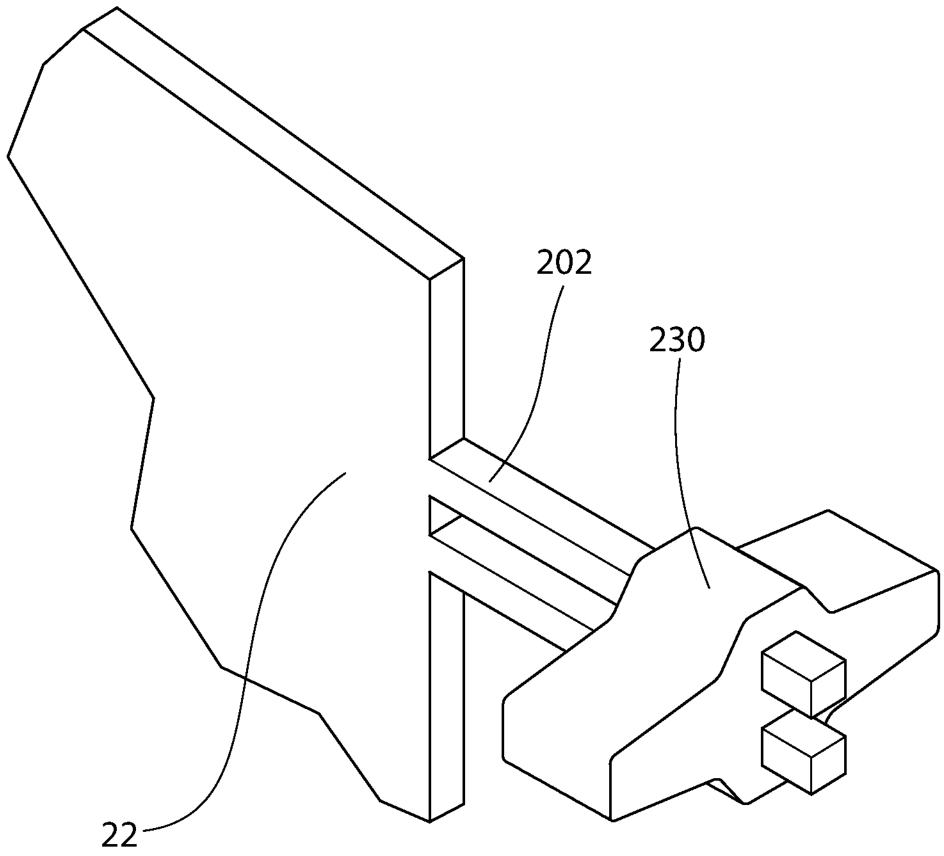
FIG. 26 is a top, front, right-side close-up view of the wind lock of FIG. 25 coupled to a closure.

FIGS. 25-26 show another embodiment of a wind lock, generally designated 230, in accordance with an exemplary embodiment of the present invention. In one embodiment, the wind lock 230 includes a body 210 with apertures 206. In one embodiment, the wind lock 230 includes a flanges 212 extending from opposing sides of the body 210. The wind lock 230 does not include the space 224 between the flanges 212 as described regarding wind lock 200. In one embodiment, a wind lock with two or more apertures may resist rotation of the wind lock about the rods.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A guide system, comprising:

a first member fixed to a structure via an anchor, wherein the first member comprises a first segment, a second segment, and a third segment, wherein the second segment is transverse to the first segment and the third segment, and the first segment and the third segment are parallel;

a coupling element fixed to the first segment of the first member, wherein the coupling element and the anchor are alternatingly positioned along the first segment of the first member; and a second member coupleable to and decoupleable from the first member fixed to the structure, the second member configured to receive the coupling element to couple the first member to the second member, wherein the second member comprises a first portion, a second portion, a third portion, a fourth portion, and a fifth portion, wherein the second portion is transverse to the first portion and the third portion, wherein the second portion is parallel to the fourth portion, and wherein the first portion, the third portion, and the fifth portion are parallel, wherein the second member includes an opening in the first portion of the second member configured to receive the coupling element, wherein the opening includes a first portion having a first portion width and a second portion having a second portion width, wherein the first portion width is greater than the second portion width and is to allow the second member to move vertically such that a body of the coupling element is moved between the first portion and the second portion of the opening, wherein the second member comprises a ramp, wherein the ramp comprises:

an angled surface relative to a surface of the first portion of the second member;

a front surface that engages the coupling element; and a side wall that defines a trough in the angled surface and the front surface, wherein the trough has a shape corresponding to the second portion of the opening, wherein the ramp is coupled to the first portion of the second member such that the trough is aligned with the second portion of the opening; and a channel defined by the third segment of the first member and the fifth portion of the second member when the first member is coupled to the second member, the channel configured to receive a portion of a closure.

2. The guide system of claim 1, wherein the closure is configured to move between an open position and a closed position with the portion of the closure in the channel.

3. The guide system of claim 1, wherein the second member is configured to be positioned adjacent to a first surface by moving the second member relative to the first member in a first direction such that the coupling element passes through the first portion of the opening of the second member.

4. The guide system of claim 3, wherein the second member is configured to move relative to the first member in a second direction such that the coupling element is moved from the first portion of the opening to the second portion of the opening.

5. The guide system of claim 4, wherein the second member is prevented from moving in the first direction when the coupling element is within the second portion of the opening.

6. The guide system of claim 4, further comprising:

a fastener configured to prevent movement of the second member relative to the first member in the second direction.

7. The guide system of claim 1, wherein the second member includes a second opening configured to receive a portion of the anchor when the second member is adjacent the first member.

8. The guide system of claim 1, wherein the coupling element is fixed to the first segment and the first portion includes the opening.

9. The guide system of claim 1, wherein at least one of: the coupling element or the anchor is not visible from outside the channel when the second member is coupled to the first member.

10. The guide system of claim 1, wherein the coupling element is adapted to couple to the first member with a fastener.

11. A guide system configured to be positioned adjacent an opening, comprising:

a closure means for selectively occluding the opening, the closure means moveable from an open position toward a closed position;

a first guide means fixed to a sidewall of the opening via an anchor, wherein the first guide means comprises a first segment, a second segment, and a third segment, wherein the second segment is transverse to the first segment and the third segment, and the first segment and the third segment are parallel;

a coupling means fixed to the first segment of the first guide means, wherein the coupling means and the anchor are alternatingly positioned along the first segment of the first guide means;

a second guide means for receiving the coupling means to couple the first guide means to the second guide means, the second guide means coupleable to and decoupleable from the first guide means fixed to the sidewall, wherein the second guide means comprises a first portion, a second portion, a third portion, a fourth portion, and a fifth portion, wherein the second portion is transverse to the first portion and the third portion, wherein the second portion is parallel to the fourth portion, and wherein the first portion, the third portion, and the fifth portion are parallel, wherein the second guide means includes an opening configured to receive the coupling means, wherein the opening includes a first portion having a first portion width and a second portion having a second portion width, wherein the first portion width is greater than the second portion width and is to allow the second guide means to move vertically such that the coupling means is moved between the first portion and the second portion of the opening, wherein the second guide means comprises a ramp, wherein the ramp comprises:

an angled surface relative to a surface of the first portion of the second guide means;

a front surface that engages the coupling means; and a side wall that defines a trough in the angled surface and the front surface, wherein the trough has a shape corresponding to the second portion of the opening, wherein the ramp is coupled to the first portion of the second guide means such that the trough is aligned with the second portion of the opening; and a channel defined by the third segment of the first guide means and the fifth portion of the second guide means when the first guide means is coupled to the second guide means, the channel configured to receive a portion of the closure means.

12. The guide system of claim 11, wherein the coupling means is also fixed to the first portion of the second guide means adjacently fixed to the first segment of the first guide means when the first guide means is fixed to the sidewall.

13. The guide system of claim 11, wherein the coupling means comprises:

a first piece that is adapted to be positioned adjacent to a first surface of the first segment of the first guide means; and a second piece that is transverse to the first piece and stands proud of the first surface, wherein the second piece comprises an arm that is cantilevered from the second piece, wherein the arm is capable of engaging with an opening of the second guide means.

14. The guide system of claim 13, wherein at least a portion of the second piece is configured to extend through the opening of the second guide means.

* * * * *